US012002236B2

(12) United States Patent
Chandler et al.

(10) Patent No.: US 12,002,236 B2
(45) Date of Patent: *Jun. 4, 2024

(54) AUTOMATED GESTURE IDENTIFICATION USING NEURAL NETWORKS

(71) Applicant: AVODAH, INC., Wilmington, DE (US)

(72) Inventors: Trevor Chandler, Thornton, CO (US); Dallas Nash, Frisco, TX (US); Michael Menefee, Richardson, TX (US)

(73) Assignee: AVODAH, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,523

(22) Filed: Aug. 9, 2021

(65) Prior Publication Data

US 2022/0026992 A1    Jan. 27, 2022

Related U.S. Application Data

(63) Continuation of application No. 16/421,158, filed on May 23, 2019, now Pat. No. 11,087,488, which is a
(Continued)

(51) Int. Cl.
*G06F 3/01*          (2006.01)
*G06F 3/03*          (2006.01)
(Continued)

(52) U.S. Cl.
CPC ............... *G06T 7/73* (2017.01); *G06F 3/017* (2013.01); *G06F 3/0304* (2013.01);
(Continued)

(58) Field of Classification Search
CPC ..... G06T 7/73; G06T 7/20; G06T 7/90; G06F 3/017; G06F 3/0304; G06F 18/256;
(Continued)

(56) References Cited

U.S. PATENT DOCUMENTS 5,481,454 A    1/1996    Inoue
5,544,050 A    8/1996    Abe
(Continued)

FOREIGN PATENT DOCUMENTS

JP      2017111660 A    6/2017
WO      2015191468 A1   12/2015

OTHER PUBLICATIONS

International Application No. PCT/US2019/017299, International Search Report and Written Opinion dated May 31, 2019 (12 pages).
(Continued)

*Primary Examiner* — Mekonen T Bekele
(74) *Attorney, Agent, or Firm* — Maynard Nexsen PC; Michael Henson

(57) ABSTRACT

Disclosed are methods, apparatus and systems for gesture recognition based on neural network processing. One exemplary method for identifying a gesture communicated by a subject includes receiving a plurality of images associated with the gesture, providing the plurality of images to a first 3-dimensional convolutional neural network (3D CNN) and a second 3D CNN, where the first 3D CNN is operable to produce motion information, where the second 3D CNN is operable to produce pose and color information, and where the first 3D CNN is operable to implement an optical flow algorithm to detect the gesture, fusing the motion information and the pose and color information to produce an identification of the gesture, and determining whether the identification corresponds to a singular gesture across the plurality of images using a recurrent neural network that comprises one or more long short-term memory units.

16 Claims, 23 Drawing Sheets

Related U.S. Application Data continuation of application No. 16/258,514, filed on Jan. 25, 2019, now Pat. No. 10,304,208.

(60) Provisional application No. 62/693,821, filed on Jul. 3, 2018, provisional application No. 62/629,398, filed on Feb. 12, 2018.

(51) Int. Cl.
    *G06F 18/25*      (2023.01)
    *G06N 3/045*      (2023.01)
    *G06T 7/20*      (2017.01)
    *G06T 7/73*      (2017.01)
    *G06T 7/90*      (2017.01)
    *G06V 40/16*      (2022.01)
    *G06V 40/20*      (2022.01)

(52) U.S. Cl.
CPC ........... *G06F 18/256* (2023.01); *G06N 3/045* (2023.01); *G06T 7/20* (2013.01); *G06T 7/90* (2017.01); *G06V 40/165* (2022.01); *G06V 40/23* (2022.01); *G06V 40/28* (2022.01)

(58) Field of Classification Search
CPC .......... G06N 3/045; G06N 3/006; G06N 3/04; G06N 3/08; G06V 40/165; G06V 40/23; G06V 40/28; G06V 10/82
See application file for complete search history.

(56) References Cited

U.S. PATENT DOCUMENTS

| | | | |
|---|---|---|---|
| 5,659,764 | A | 8/1997 | Sakiyama |
| 5,704,012 | A | 12/1997 | Bigus |
| 5,887,069 | A * | 3/1999 | Sakou .................. G06F 18/256 382/209 |
| 6,477,239 | B1 | 11/2002 | Ohki |
| 6,628,244 | B1 | 9/2003 | Hirosawa |
| 7,027,054 | B1 | 4/2006 | Cheiky |
| 7,702,506 | B2 | 4/2010 | Yoshimine |
| 8,488,023 | B2 | 7/2013 | Bacivarov et al. |
| 8,553,037 | B2 | 10/2013 | Smith |
| 8,751,215 | B2 | 6/2014 | Tardif |
| D719,472 | S | 12/2014 | Sakaue et al. |
| D721,290 | S | 1/2015 | Varacca |
| D722,315 | S | 2/2015 | Liang et al. |
| D752,460 | S | 3/2016 | Gnauck |
| 9,305,229 | B2 | 4/2016 | DeLean et al. |
| 9,418,458 | B2 | 8/2016 | Chertok |
| 9,715,252 | B2 | 7/2017 | Reeves et al. |
| 10,037,458 | B1 | 7/2018 | Mahmoud |
| 10,289,903 | B1 | 5/2019 | Chandler et al. |
| 10,304,208 | B1 * | 5/2019 | Chandler ............. G06V 40/165 |
| 10,346,198 | B1 | 7/2019 | Chandler et al. |
| 10,489,639 | B2 | 11/2019 | Menefee et al. |
| 10,521,264 | B2 | 12/2019 | Chandler et al. |
| 10,521,928 | B2 | 12/2019 | Chandler et al. |
| 10,580,213 | B2 | 3/2020 | Browy et al. |
| 10,599,921 | B2 | 3/2020 | Menefee et al. |
| 10,956,725 | B2 | 3/2021 | Menefee et al. |
| 11,036,973 | B2 | 6/2021 | Chandler et al. |
| 11,087,488 | B2 * | 8/2021 | Chandler ................ G06F 3/017 |
| 2002/0069067 | A1 | 6/2002 | Klnefelter |
| 2003/0191779 | A1 | 10/2003 | Sagawa |
| 2004/0210603 | A1 | 10/2004 | Roston |
| 2005/0258319 | A1 | 11/2005 | Jeong |
| 2006/0134585 | A1 | 6/2006 | Adaamo-Villani |
| 2006/0139348 | A1 | 6/2006 | Harada |
| 2006/0204033 | A1 | 9/2006 | Yoshimine |
| 2008/0013793 | A1 | 1/2008 | Hillis |
| 2008/0013826 | A1 | 1/2008 | Hillis |
| 2008/0024388 | A1 | 1/2008 | Bruce |
| 2008/0201144 | A1 | 8/2008 | Song |
| 2009/0022343 | A1 * | 1/2009 | Van Schaack ......... H04R 5/033 381/309 |
| 2010/0044121 | A1 | 2/2010 | Simon |
| 2010/0194679 | A1 | 8/2010 | Wu et al. |
| 2010/0296706 | A1 | 11/2010 | Kaneda et al. |
| 2010/0310157 | A1 | 12/2010 | Kim |
| 2011/0221974 | A1 | 9/2011 | Stem |
| 2011/0228463 | A1 | 9/2011 | Matagne |
| 2011/0274311 | A1 | 11/2011 | Lee |
| 2011/0301934 | A1 | 12/2011 | Tardif |
| 2012/0206456 | A1 | 8/2012 | Crocker |
| 2012/0206457 | A1 | 8/2012 | Crocker |
| 2013/0100130 | A1 | 4/2013 | Crocker |
| 2013/0124149 | A1 | 5/2013 | Carr et al. |
| 2013/0318525 | A1 | 11/2013 | Palanisamy |
| 2014/0101578 | A1 | 4/2014 | Kwak |
| 2014/0225890 | A1 | 8/2014 | Ronot et al. |
| 2014/0253429 | A1 | 9/2014 | Dai |
| 2014/0309870 | A1 | 10/2014 | Ricci et al. |
| 2015/0092008 | A1 | 4/2015 | Manley |
| 2015/0187135 | A1 | 7/2015 | Magder et al. |
| 2015/0244940 | A1 | 8/2015 | Lombardi et al. |
| 2015/0317304 | A1 | 11/2015 | An |
| 2015/0324002 | A1 | 11/2015 | Quiet et al. |
| 2016/0042228 | A1 | 2/2016 | Opalka et al. |
| 2016/0196672 | A1 | 7/2016 | Chertok |
| 2016/0267349 | A1 | 9/2016 | Shoaib |
| 2016/0320852 | A1 | 11/2016 | Poupyrev |
| 2016/0379082 | A1 | 12/2016 | Rodriguez et al. |
| 2017/0090995 | A1 | 3/2017 | Jubinski |
| 2017/0153711 | A1 | 6/2017 | Dai et al. |
| 2017/0206405 | A1 * | 7/2017 | Molchanov ............ G06N 3/044 |
| 2017/0220836 | A1 | 8/2017 | Phillips et al. |
| 2017/0236450 | A1 | 8/2017 | Jung et al. |
| 2017/0255832 | A1 | 9/2017 | Jones et al. |
| 2017/0351910 | A1 | 12/2017 | Elwazer |
| 2018/0018529 | A1 | 1/2018 | Hiramatsu |
| 2018/0032846 | A1 | 2/2018 | Yang et al. |
| 2018/0047208 | A1 | 2/2018 | Marin |
| 2018/0101520 | A1 | 4/2018 | Fuchizaki |
| 2018/0107901 | A1 | 4/2018 | Nakamura et al. |
| 2018/0137644 | A1 | 5/2018 | Rad et al. |
| 2018/0144214 | A1 | 5/2018 | Hsieh et al. |
| 2018/0181809 | A1 | 6/2018 | Ranjan |
| 2018/0189974 | A1 | 7/2018 | Clark |
| 2018/0268601 | A1 | 9/2018 | Rad |
| 2018/0373985 | A1 | 12/2018 | Yang |
| 2018/0374236 | A1 | 12/2018 | Ogata |
| 2019/0026956 | A1 | 1/2019 | Gausebeck |
| 2019/0043472 | A1 | 2/2019 | Garcia |
| 2019/0064851 | A1 | 2/2019 | Tran |
| 2019/0066733 | A1 | 2/2019 | Somanath |
| 2019/0251343 | A1 | 8/2019 | Menefee et al. |
| 2019/0251344 | A1 | 8/2019 | Menefee et al. |
| 2019/0251702 | A1 | 8/2019 | Chandler et al. |
| 2019/0332419 | A1 | 10/2019 | Chandler et al. |
| 2020/0005028 | A1 | 1/2020 | Gu |
| 2020/0034609 | A1 | 1/2020 | Chandler et al. |
| 2020/0104582 | A1 | 4/2020 | Menefee et al. |
| 2020/0126250 | A1 | 4/2020 | Chandler et al. |
| 2021/0374393 | A1 | 12/2021 | Chandler et al. |
| 2022/0026992 | A1 | 1/2022 | Chandler et al. |
| 2022/0036050 | A1 | 2/2022 | Chandler et al. |

OTHER PUBLICATIONS

Menefee, M. et al. U.S. Appl. No. 16/270,540, Non-Final Office Action dated Jul. 29, 2019, (9 pages).

Chandler, T. et al. U.S. Appl. No. 16/270,532, Notice of Allowance dated Aug. 12, 2019, (11 pages).

Chandler, T. et al. U.S. Appl. No. 16/505,484, Notice of Allowance dated Aug. 21, 2019, (16 pages).

Menefee, M. et al. U.S. Appl. No. 16/694,965, Notice of Allowance dated Nov. 10, 2020, (pp. 1-6).

Menefee, M. et al. U.S. Appl. No. 16/694,965 Non-Final Office Action dated Mar. 5, 2020 (pp. 1-6).

Menefee, M et al., U.S. Design U.S. Appl. No. 29/678,367, Non-Final Office Action dated Apr. 6, 2020, (pp. 1-28).

(56) References Cited

OTHER PUBLICATIONS

Menefee, M. et al., U.S. Design U.S. Appl. No. 29/678,367, Notice of Allowance, dated Oct. 22, 2020, (pp. 1-7).
International Application No. PCT/US2019/017299, International Preliminary Report on Patentability dated Aug. 27, 2020 (pp. 1-9).
International Application No. PCT/US2020/016271, International Search Report and Written Opinion, dated Jun. 30, 2020 (pp. 1-12).
Chandler, Trevor, et al. U.S. Appl. No. 16/410,147 Ex Parte Quayle Action dated Dec. 15, 2020, pp. 1-6.
Chandler, Trevor, et al. U.S. Appl. No. 16/410,147 Notice of Allowance, dated Feb. 11, 2021, pp. 1-8.
Chandler, T. et al. U.S. Appl. No. 16/258,514 Notice of Allowance dated Mar. 27, 2019, (pp. 1-8).
Chandler, T. et al. U.S. Appl. No. 16/258,524 Notice of Allowance dated Apr. 23, 2019, (pp. 1-16).
Chandler, T. et al. U.S. Appl. No. 16/258,531 Notice of Allowance dated Mar. 25, 2019, (pp. 1-8).

* cited by examiner

AUTOMATED GESTURE IDENTIFICATION USING NEURAL NETWORKS

CROSS-REFERENCE TO RELATED APPLICATIONS

This patent document is a continuation of U.S. patent application Ser. No. 16/421,158 entitled "AUTOMATED GESTURE IDENTIFICATION USING NEURAL NETWORKS' and filed on May 23, 2019 which is a continuation of U.S. patent application Ser. No. 16/258,514 entitled "AUTOMATED GESTURE IDENTIFICATION USING NEURAL NETWORKS" and filed on Jan. 25, 2019, now issued U.S. Pat. No. 10,304,208, which claims the benefits and priority of U.S. Provisional Patent Application No. 62/693,821 entitled "NEURAL NETWORK PROCESSING FOR SIGN LANGUAGE TRANSLATION" and filed on Jul. 3, 2018 and U.S. Provisional Patent Application No. 62/629,398 entitled "INTERACTIVE AUTOMATED SIGN LANGUAGE TRANSLATION METHOD AND APPARATUS" and filed on Feb. 12, 2018. The entire contents of the before-mentioned patent applications are incorporated by reference as part of the disclosure of this patent document.

TECHNICAL FIELD

This document generally relates to neural networks, and more particularly to neural networks for gesture and action recognition.

BACKGROUND

Neural networks are currently the foundation for many modern artificial intelligence (AI) applications. The superior performance of neural networks comes from their ability to extract high-level features from raw sensory data after using statistical learning over a large amount of data to obtain an effective representation of an input space. Implementations of neural networks find applications in a myriad of applications from self-driving cars, to detecting cancer, and to playing complex games.

One specific application of neural networks for gesture and action recognition is sign language translation. A sign language (also known as signed language) is a language that uses manual communication to convey meaning, ideas and thoughts, which simultaneously employs hand gestures, audible cues (e.g., uttered sounds or clicks), movement, orientation of the fingers, arms or body, and facial expressions to convey a speaker's ideas. The complexity of sign language may be captured, in part, by using neural networks for its translation and communication.

SUMMARY

Disclosed are devices, systems and methods for using implementations of neural networks for identifying gestures and actions in various applications, including automated sign language translation and communication.

In one aspect, the disclosed technology provides a neural network system adapted for processing images associated with a gesture. This system includes one or more three-dimensional convolution neural networks (3D CNNs) and at least one recurrent neural network (RNN). Each of the 3D CNNs include an input to receive a plurality of input images and an output to provide recognition information produced by each of the 3D CNNs. The at least one RNN includes an input to receive a second type of recognition information and an output that is coupled to the input of the RNN to provide a feedback connection. This system further includes at least one processor coupled to a non-transitory memory with instructions stored thereon, the instructions upon execution by the processor, causing the at least one processor to carry out operations that process the images associated with the gesture. The at least one processor includes a pre-processing module that receives a plurality of captured images, performs pose estimation on each of the plurality of captured images, and overlays pose estimation pixels onto the plurality of captured images to generate the plurality of input images for consumption by the one or more 3D CNNs. The at least one process further includes a fusion center that receives the recognition information produced by each of the one or more 3D CNNs, and aggregates the received recognition information to generate the second type of recognition information for consumption by the RNN. In this system, each of the one or more 3D CNNs is operable to produce the recognition information comprising at least one characteristic (e.g., a pose, a color or a gesture type) associated with the gesture in each of the plurality of images and provide the recognition information to the fusion module. In this system, the RNN is operable to determine whether the recognition information produced by the one or more 3D CNNs corresponds to a singular gesture across the plurality of input images.

In another aspect, the disclosed technology may be used to identify a sign language gesture performed by a subject. This method includes receiving a plurality of images associated with the gesture, providing the plurality of images to a first 3D CNN and a second 3D CNN, fusing the motion information and the pose and color information to produce an identification of the gesture, and determining whether the identification corresponds to a singular gesture across the plurality of images using an RNN that comprises one or more long short-term memory (LTSM) units. In this method, the first 3D CNN is operable to produce motion information and the second 3D CNN is operable to produce pose and color information.

In yet another aspect, an apparatus comprising a memory and a processor implements the above-described methods is disclosed.

In yet another aspect, the method may be embodied as processor-executable code and may be stored on a non-transitory computer-readable program medium.

The above and other aspects and features of the disclosed technology are described in greater detail in the drawings, the description and the claims.

DETAILED DESCRIPTION

Figure 1:
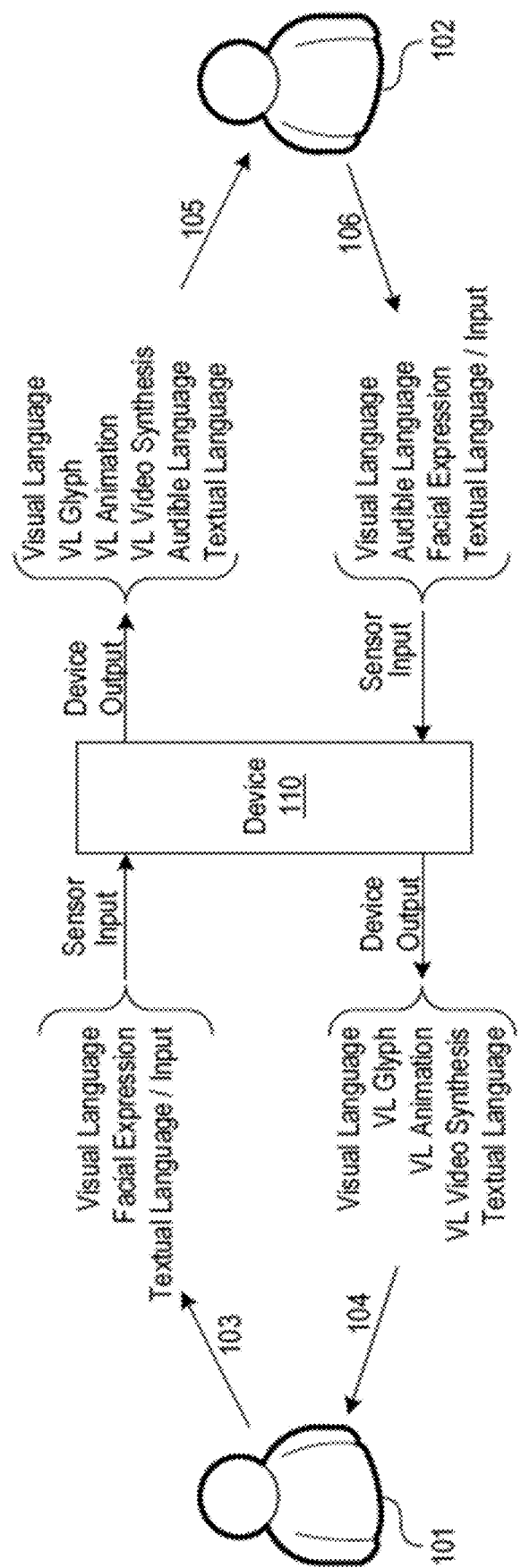
FIG. 1 illustrates a two-way translation system used by two parties in accordance with an example embodiment of the disclosed technology.

Using neural networks for gesture and action identification is an actively growing area of research, with the recognition accuracy increasing with the recent developments in neural network architectures and training methods. Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems.

One specific application of using neural networks for gesture and action identification is sign language communication and translation. Sign languages are extremely complex, and generally do not have a linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

While the embodiments of the disclosed technology find applications in different technologies, the disclosed embodiments that are implemented for sign language translation are flexible and adaptable in that an input sign language, which can be any one of a several sign languages, is converted to an internal representation, allowing the input sign language into one or more of a variety of output sign languages. Furthermore, the embodiments described in this document employ a multiplicity of different sensors and processing mechanisms to be able to capture and process information that may not be obtainable when a single sensor or process is utilized. The disclosed embodiments further facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language.

FIGS. 1-10 are illustrations offered to provide the proper context for the specific application of a sign language translation system that can benefit from the neural network configurations and processing that are described in later sections of this document. FIG. 1 illustrates a two-way translation system used by two parties in accordance with an example embodiment of the disclosed technology. As illustrated in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g. another sign language) that may include glyphs, animations or video synthesis (e.g. avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
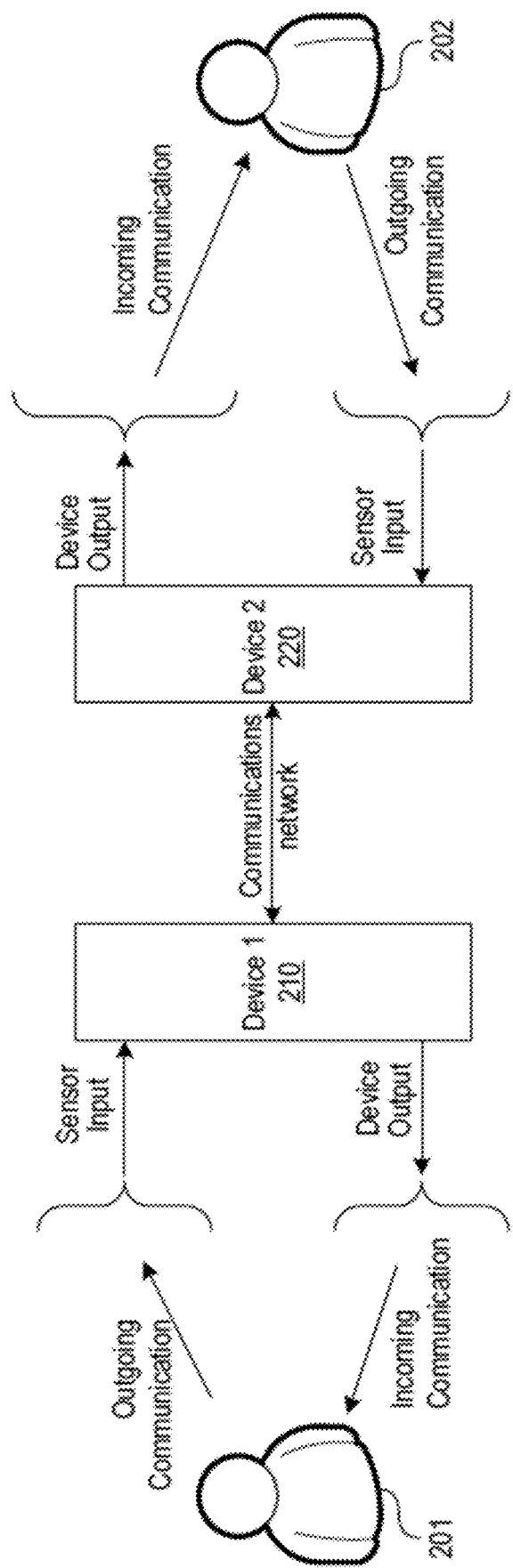
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As illustrated in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
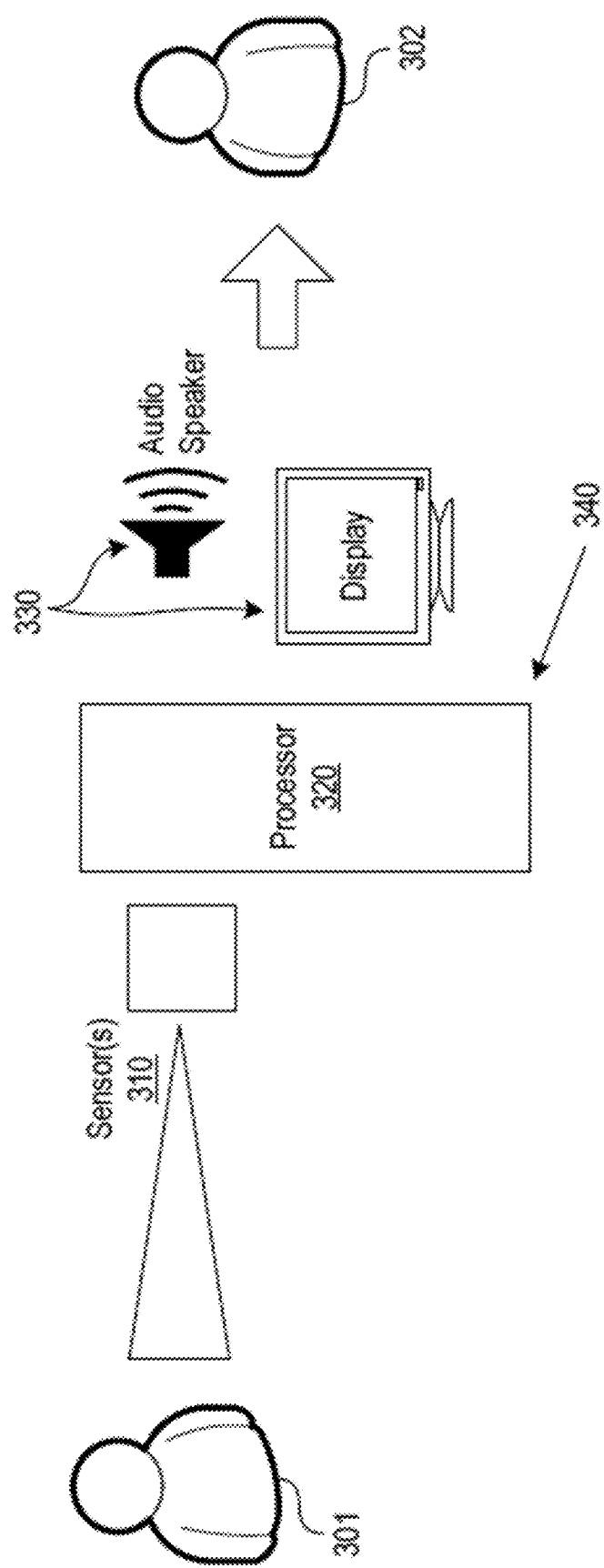
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those illustrated in FIGS. 1-2, and described above, and their description is not repeated. As illustrated in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include one or more gestures, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
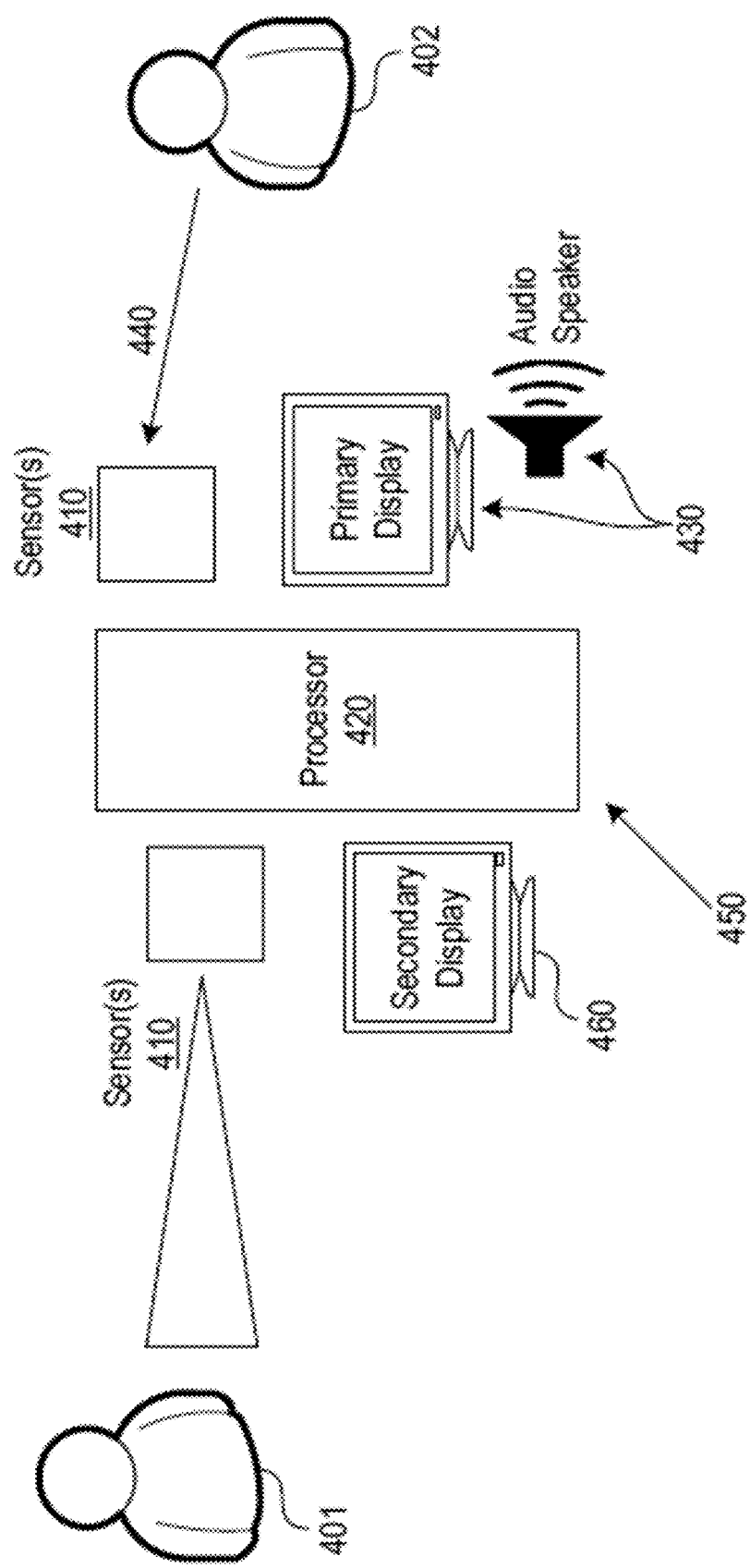
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As illustrated in FIG. 4, the translation system includes one or more sensors 410, one or more processors 420, and various output devices that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input interfaces, such as a keyboard or a touchscreen, to receive physical input from the second party 402.

The audible or textual input from the second part is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
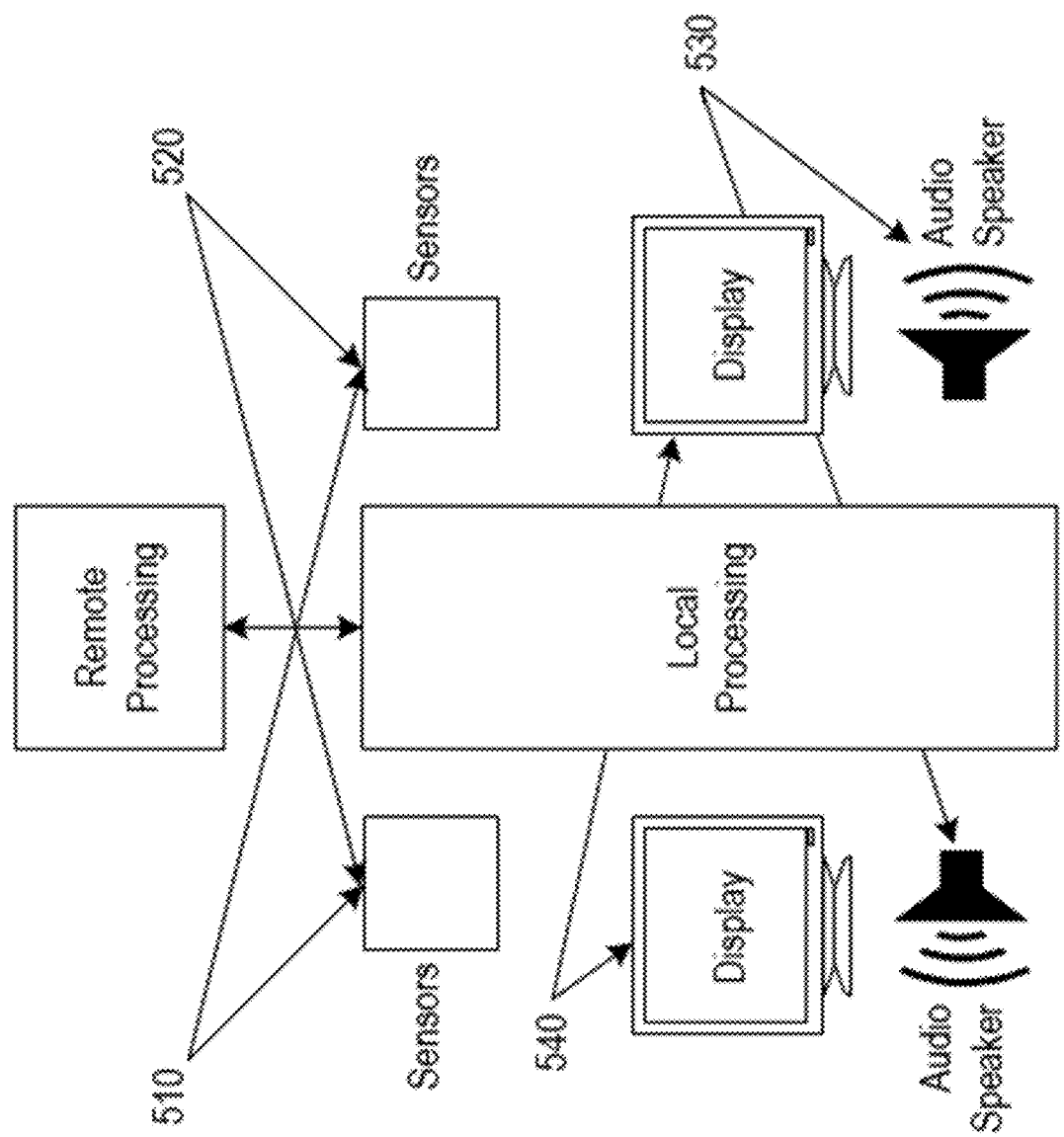
FIG. 5 illustrates a configurable automated translation system in accordance with an example embodiment of the disclosed technology.

FIG. 5 illustrates a configurable automated translation system in accordance with an example embodiment of the disclosed technology. As illustrated in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 520, e.g. a microphone, a microphone array or 3D microphone, a touchscreen keyboard, or a physical keyboard.

In addition to the input sensors described above, the device includes a host of output capabilities. For example, standard language rendering may be performed using a textual display 540 or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textual display 540 or speaker 530.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
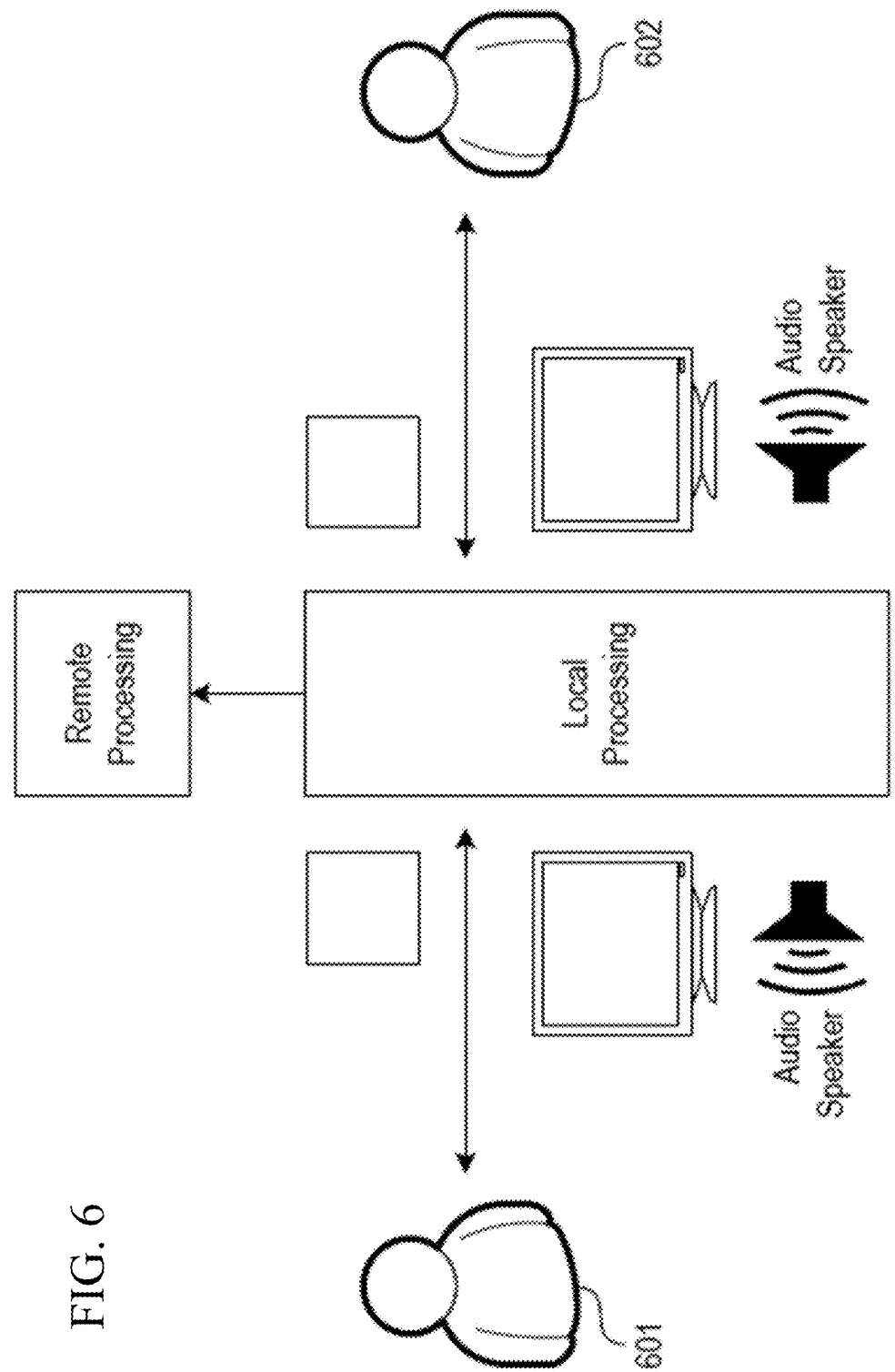
FIG. 6 illustrates another configurable automated translation system in accordance with an example embodiment of the disclosed technology.

FIG. 6 illustrates another configurable automated translation system in accordance with an example embodiment of the disclosed technology. As illustrated in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
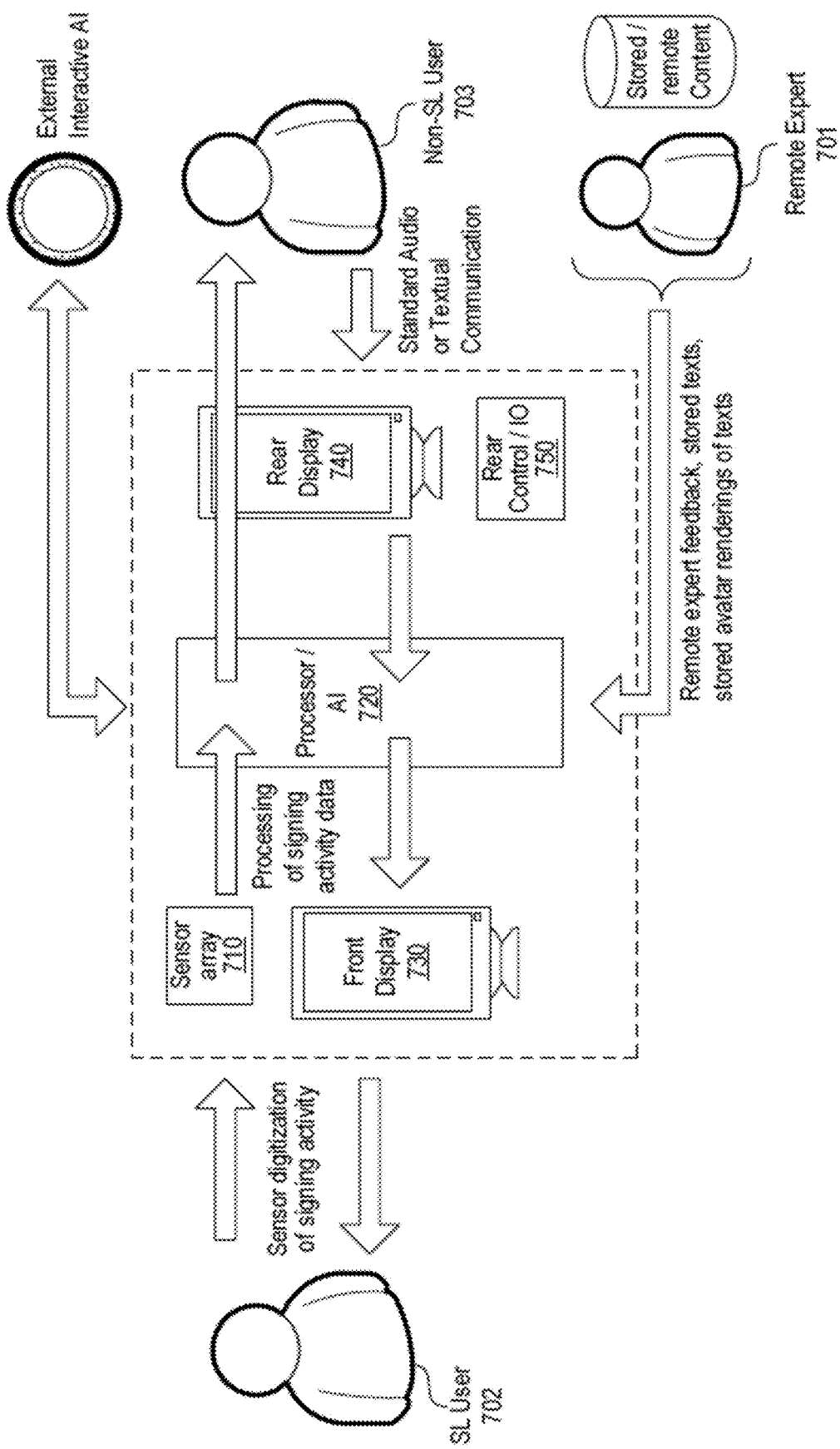
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language(s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8B:
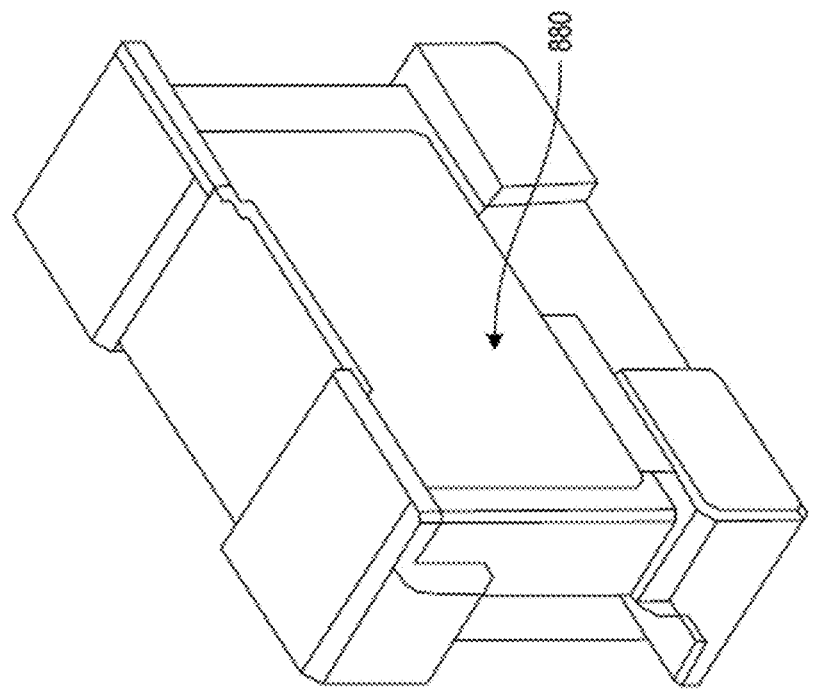
FIG. 8B illustrates another view of an image capture and processing device that can be used for automated sign language translation in accordance with an example embodiment of the disclosed technology.
Figure 8A:
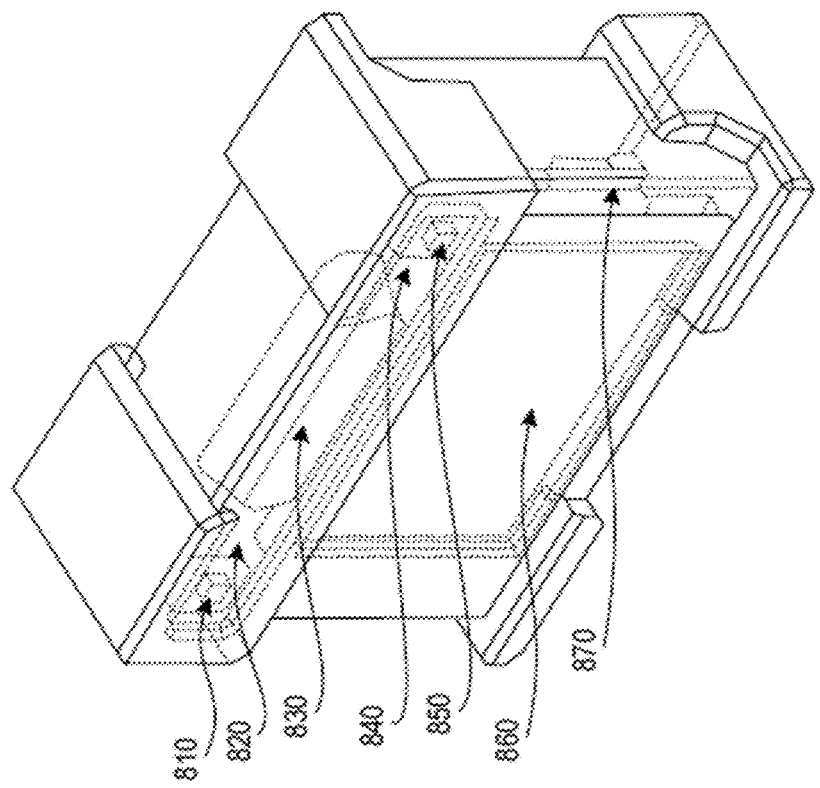
FIG. 8A illustrates one view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As illustrated in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 830, and one or more processors 870. In some embodiments, the one or more processors include an ARM Cortext-M3 processor and at least one graphics processing unit (GPU). In other embodiments, and as illustrated in FIG. 8B, the device may further comprise a rear display 880, which may be a touch-screen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
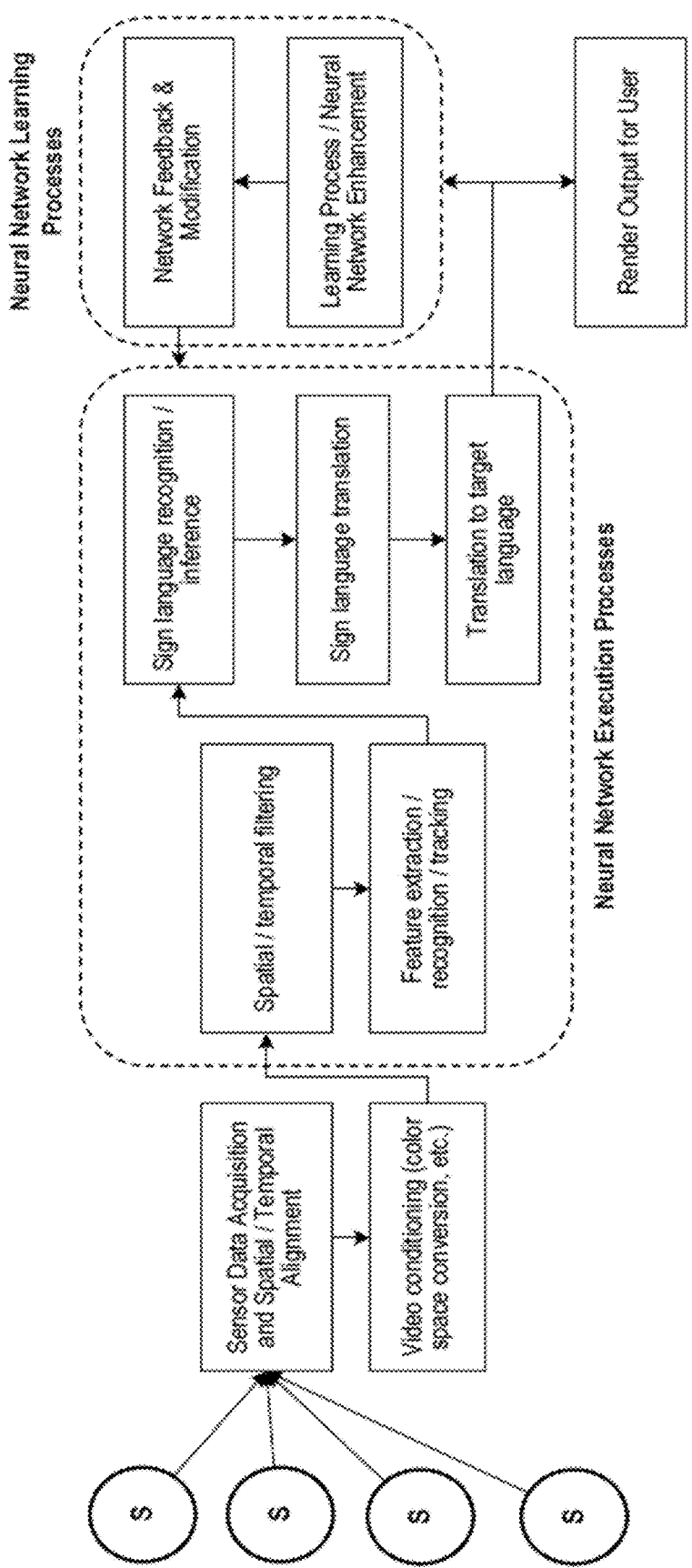
FIG. 9 illustrates a flow diagram of operations that can be carried out by various component to implement automated sign language translation in accordance with an example embodiment of the disclosed technology.

FIG. 9 illustrates an example flow diagram of operations that can be carried out by various components to implement automated sign language translation in accordance with one or more embodiments of the disclosed technology. This example includes some features and components that are similar to those described above, and their description is not repeated.

As illustrated in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations can be performed. For example, the input data collected from the multiple sensors is first aligned, both spatially and temporally. For example, based on the video quality and the external lighting and other conditions, video conditioning procedures (e.g. color space conversion) may be implemented. This operation may be followed by spatial and temporal filtering to, for example, reduce the data to a particular resolution, retain data for only a particular spatial zone of interest or a temporal period of interest. The processing may further include the application of image and/or video processing methods, e.g. edge detection, which conditions the data for additional processing.

The conditioned data of the communication from the sign language user can then be processed in order to extract features of gestures, facial cues and body cues, amongst other features that enable the identification of the sign language. The input sign language is translated to an internal representation, and subsequently translated to the target language. The output is then rendered to the user.

In some embodiments, the feature extraction, identification and translation may be part of a neural network execution process. Before the neural network starts the execution process, the neural network is trained by the neural network learning process. The techniques discussed in later sections of this document can be implemented in the neural network learning process to allow the trained neural network to recognize a large number of characteristics in the input data more efficiently and more accurately. To perform the neural network learning process, a set of training data can be used to carry out training algorithms such as supervised training of the neural network. In some embodiments, as part of feedback for the learning process, the translated sign language is used to further train and modify the neural network to improve its identification and translation capabilities. In yet other embodiments, reinforcement training of neural networks may be employed to improve performance and increase the flexibility and adaptability of embodiments of the disclosed technology.

Figure 10:
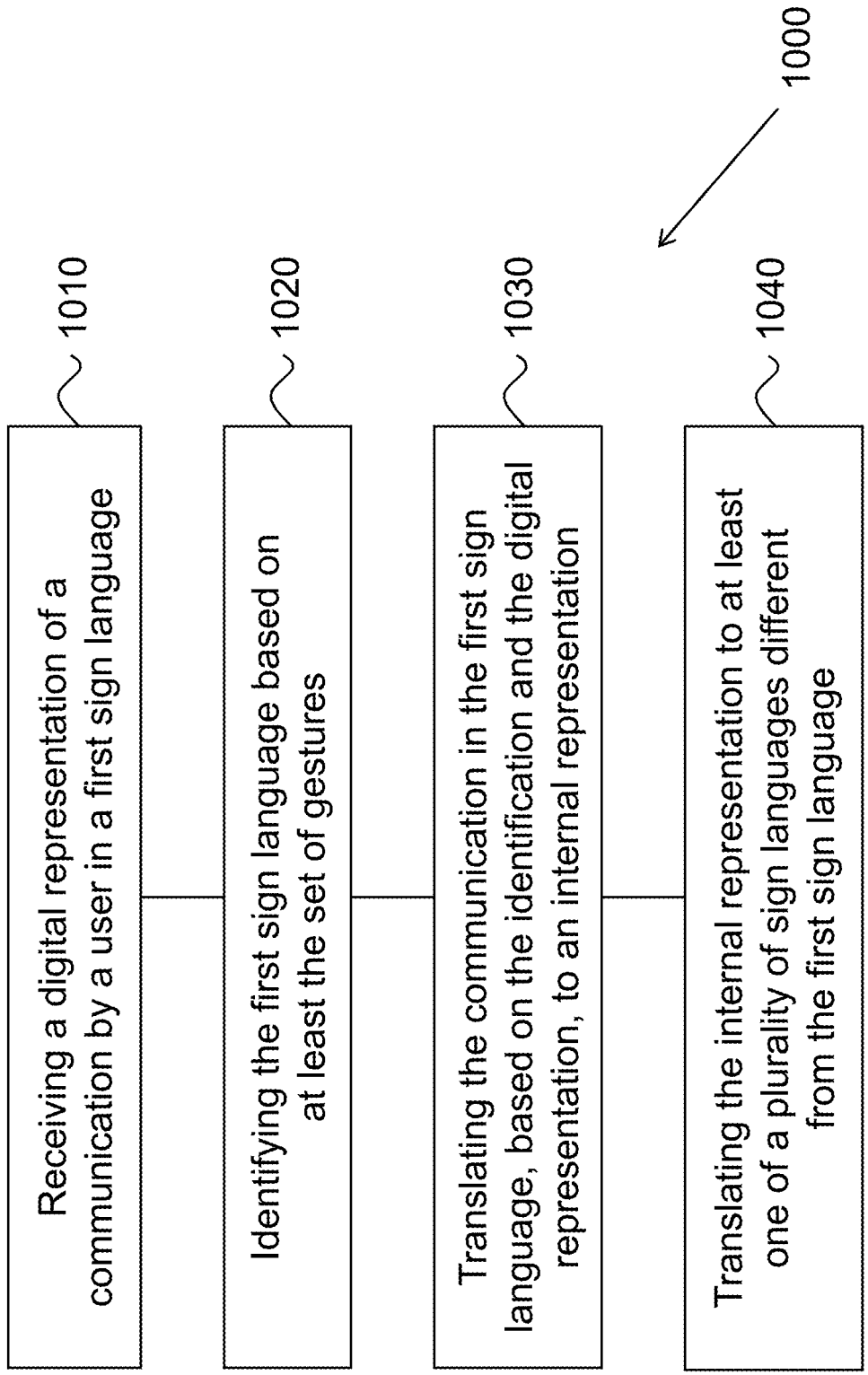
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1010, receiving a digital representation of a communication by a user in a first sign language. In some embodiments, the digital representation includes a plurality of images. In other embodiments, the digital representation includes a video recording.

The method 1000 includes, at operation 1020, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1030, translating the communication in the first sign language, based on the identification and the digital representation, to an internal representation. The method 1000 includes, at operation 1040, translating the internal representation to at least one of a plurality of sign languages different from the first sign language. In some embodiments, the translation may be based on sign language content curated by an expert. For example, and when translating known subject matter (e.g. the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained that must undergo further processing and analysis to extract the information of interest. Generation and analysis of large amounts of data are hallmarks of other systems and applications, such as autonomous vehicles and medical applications that involve analysis of medical images (e.g., MRI, X-ray, CT scan, video content, etc.). Additional applications for the teachings herein include, but are not limited to, interactive video games, airport security and surveillance applications, analysis and training for various sports, interactive home devices, and others.

In some embodiments, the example configurations in FIGS. 1-10 can include implementations of neural networks that can capture the complexities and nuances associated with pattern recognition of object movements, including gestures in a sign language that can facilitate its communication and translation.

A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs.

CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data. The presently disclosed technology extends the typical CNN (which is two-dimensional) to three-dimensions, thereby enabling the CNN to operate on actions or motions, instead of just images.

In other words, the 3D CNN has temporal data in its $3^{rd}$ dimension as compared to a 2D CNN that only has spatial data. This means the model has sets of images that belong to a single sequence of related events instead of only having single frames that match an object with spatial only data.

Figure 11:
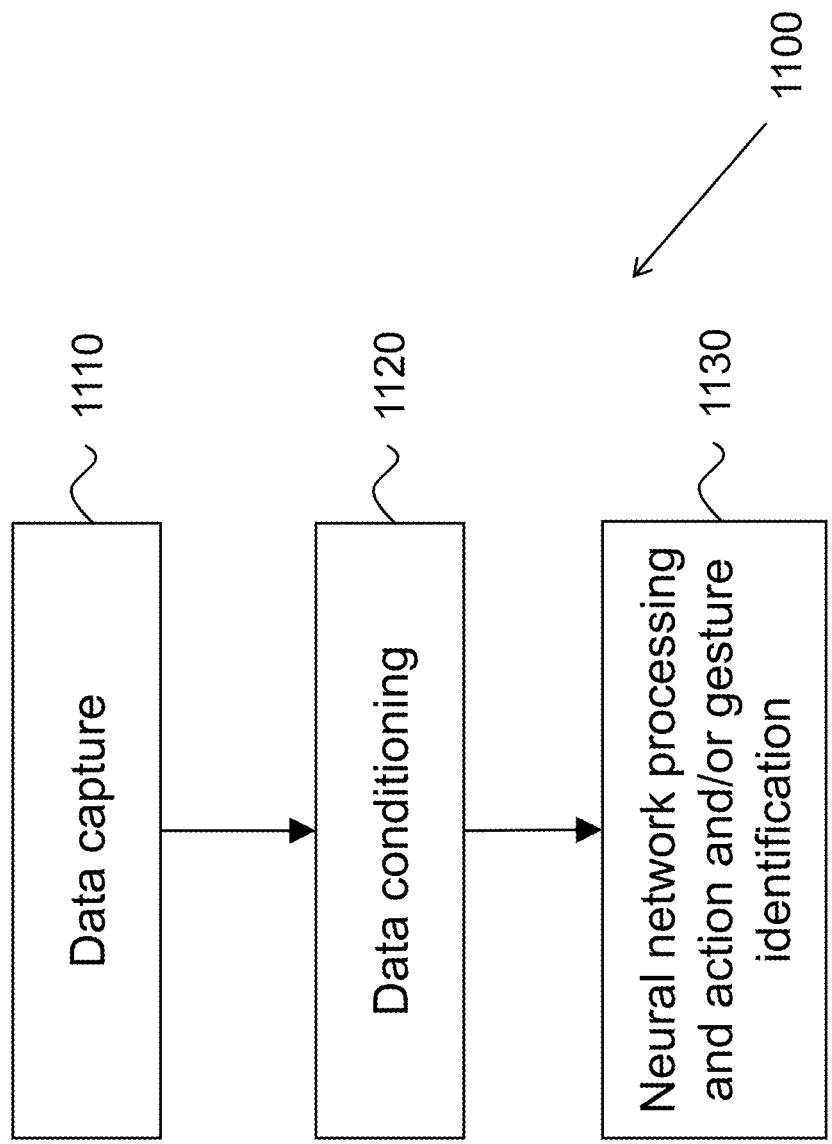
FIG. 11 is a simplified block diagram illustrating an exemplary method for neural network processing with data compression.

FIG. 11 is a block diagram that illustrates an exemplary method for neural network processing with reduced data that includes capturing data 1110, such as a sign language gesture or other movements of objects, conditioning the data 1120 and processing and action/gesture identification 1110 that is carried out using a neural network. In some embodiments, the data capture 1110 is carried out using one or more cameras and/or sensors that capture movements associated with an action or gesture performed by a user. For example, a data capture module may include multiple cameras that capture the sign language movement from different angles and/or in different portions (or bands) of the frequency spectrum (e.g., visible light, infra-red). It may further include audio or haptic sensors to capture the nuances of the sign language movements.

The data capture module communicates the captured action or gesture to the data conditioning module. While certain signal conditioning and processing can occur at the data capture module, the data conditioning module can perform operations that include eliminating information that may not be relevant to the subsequent detection of the action or gesture. This reduced set of information is then passed to the neural network framework to further process the data and identify or recognize the action and/or gesture based on data that was used to train the neural network.

As discussed earlier, a neural network operates more efficiently if it is trained on only the relevant features and is subsequently used to detect those relevant features. For example, if a neural network was used to identify pets in images, any buildings or vehicles in the image could be removed without affecting the detection accuracy. Similarly, in the case of detecting and identifying actions and gestures, the images may be preprocessed to eliminate any information that is not relevant to the particular actions or gestures being identified. This data conditioning, which may be implemented in the data conditioning module 220, can reduce the amount of pixel information that is processed by the neural network, but without compromising detecting accuracy. Although in some sections of this document examples related to sign language capture and translation have been described to illustrate specific actions and/or gestures, the embodiments and method described herein are applicable to a variety of actions and/or gestures.

Figure 12A:
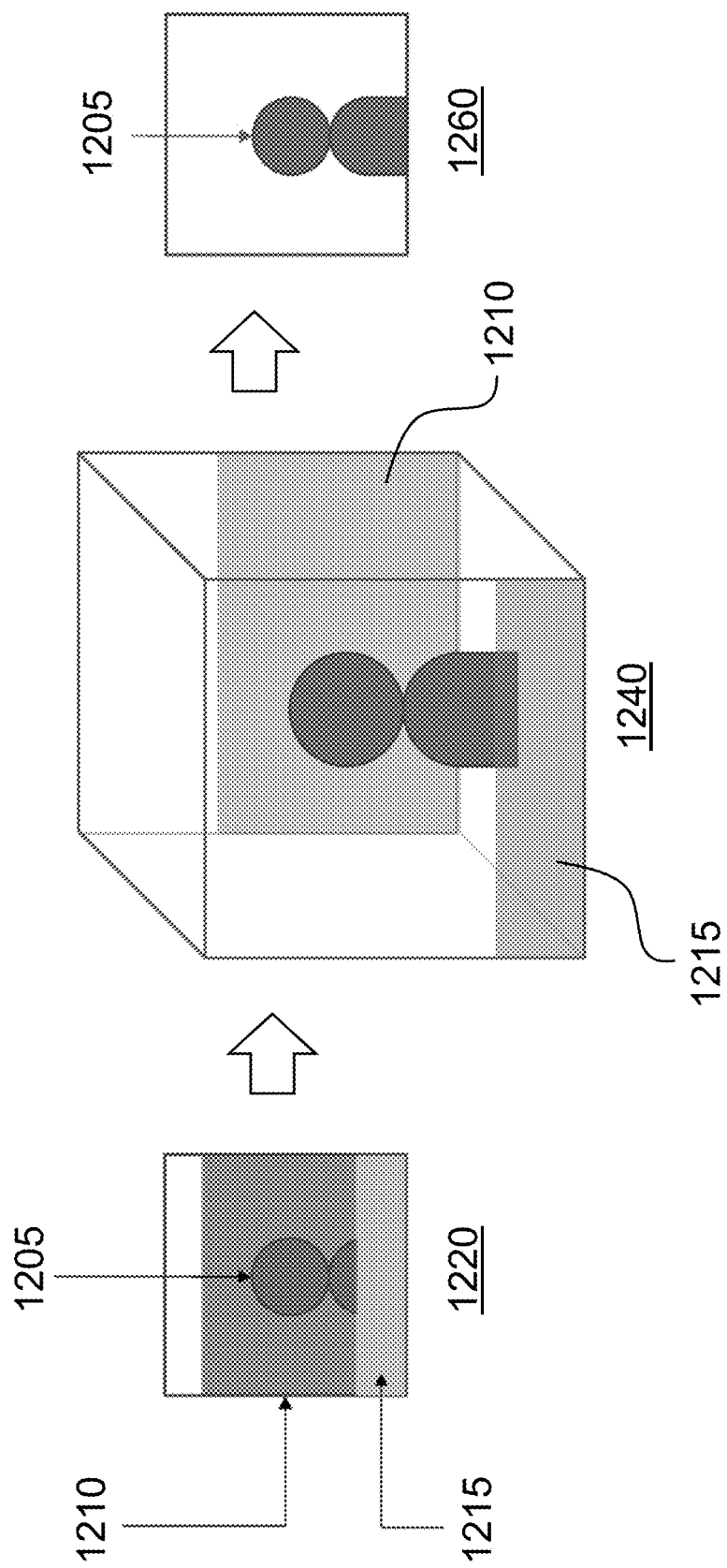
FIGS. 12A-12C illustrate different examples of filtering to reduce information prior to neural network processing.
Figure 12B:
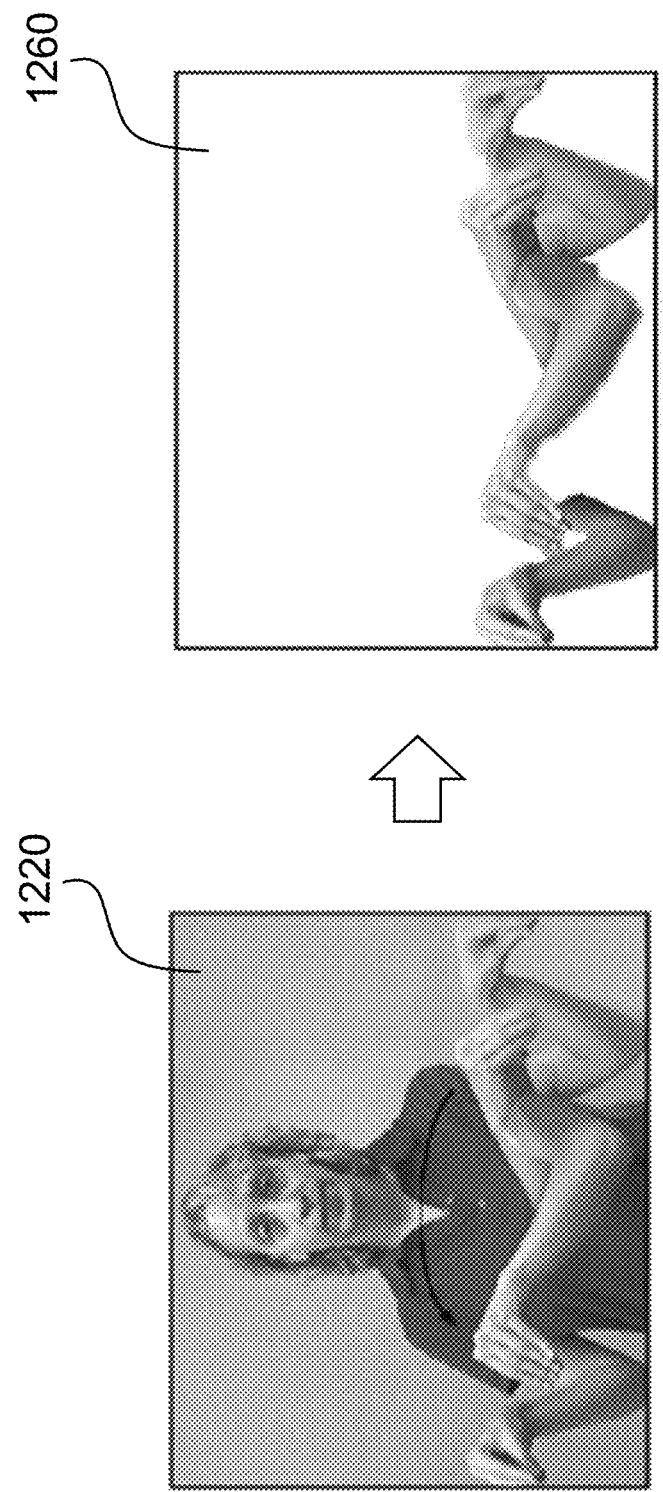
Figure 12C:
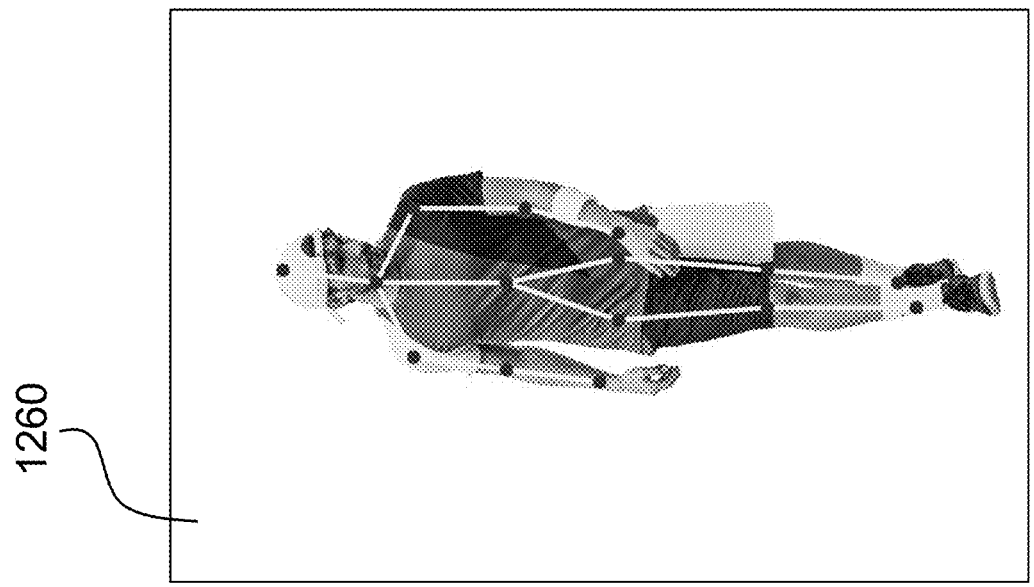
Figure 12C:
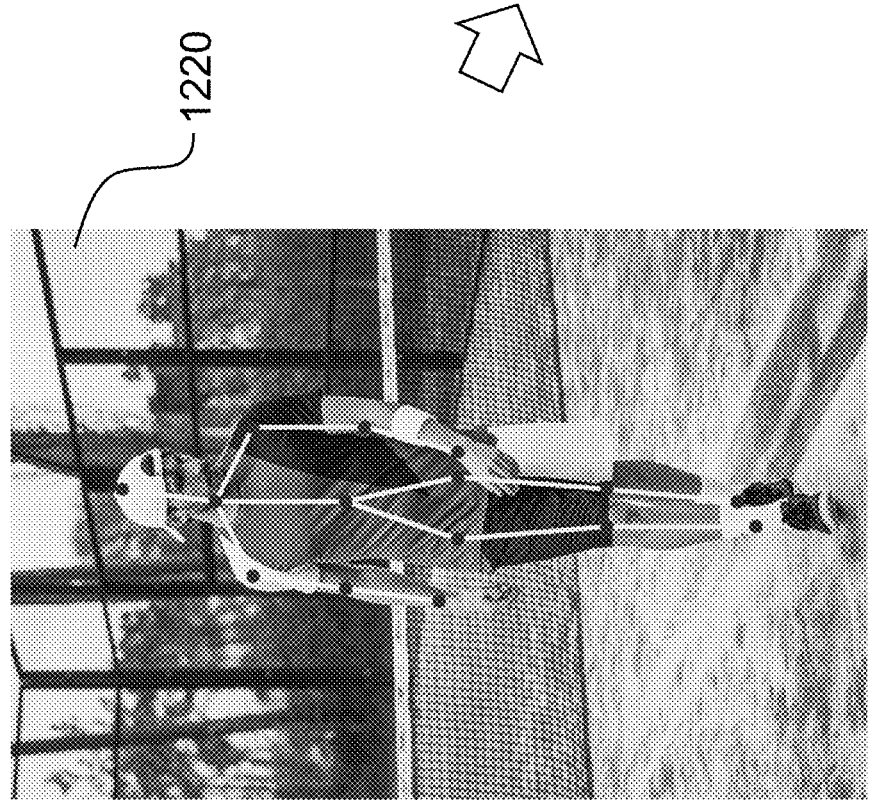

FIGS. 12A-12C illustrate different examples of filtering operations that can be carried out to reduce information prior to neural network processing. FIG. 12A illustrates an example of spatial filtering, which begins with an input frame 1220 that includes the subject 1205, a background 1210 and a foreground 1215. As illustrated in FIG. 12A, the input frame 1220 is processed to generate an intermediate frame 1240 in which the subject has been separated from the foreground 1215 and the background 1210. If the subject is signing in a studio or a benign setting (e.g., while capturing training data), the foreground and background will typically provide no (or very minimal) additional information corresponding to the sign language movement. This, in one example, results in the generation of an output frame 1260, which only contains the subject 1205.

In contrast to the example shown in FIG. 12A, the sign language movement may include external input (e.g., a person or other items that the subject is pointing to or is otherwise referencing, as well as objects, background settings, lighting conditions, sounds or other passive or active items or conditions that can be captured by the sensing devices). In this example, the input frame 1220 may be separated into the subject, foreground information, and background information. The output frame (corresponding to the output frame 1260 in FIG. 12A) may include the subject and a subset of the one or more foreground or background information, which include features that are relevant to the sign language movement. In general, the spatial processing operations are carried out on a single frame basis, but similar operations can be carried out over multiple frames to reduce or eliminate spatial data that is not needed for sign language recognition.

FIG. 12B illustrates the superposition of multiple frames as an input 1220 to the 2D temporal filtering process, which transforms the input data to output information 1260. In the example shown, the output data 1220 includes the hands of the subject, which, include the entirety of the sign language movement. In some embodiments, in which the subject's emotions were part of the information communicated by the movement, the subject's face (not shown in FIG. 12B) is also present in the output. As seen in FIG. 12B, the background and other parts of the frames have been removed, so as to reduce the data that is input to the neural network, thereby lowering the complexity and improving the efficiency of the neural network processing.

FIG. 12C shows an example of pose detection that can be carried out as part of filtering operations. As shown in FIG. 12C, an input frame 1220 includes a subject with a background and has been processed using a pose detection algorithm that superimposes a skeleton on the subject. A subsequent step uses the skeleton to eliminate the background information that is not relevant for generating the output frame 1260. In some embodiments, if the subject is referencing an external object, the pose detection algorithm can recognize that the skeleton of the subject is, for example, pointing to an object, and can include the external object in the output frame for processing by the neural network.

In some embodiments, the skeleton can be tagged with different parts of the human body (e.g., head, chest, right arm, right shoulder, etc.), and elements that are not part of the sign language movement may be removed. This is an example of spatially locked de-selection, which advantageously enables a boost in performance and accuracy of the neural network operations since less pixel information and polygons are processed, but the correct aspect and spatial characteristics are preserved by implementation of the presently disclosed technology.

Figure 13:
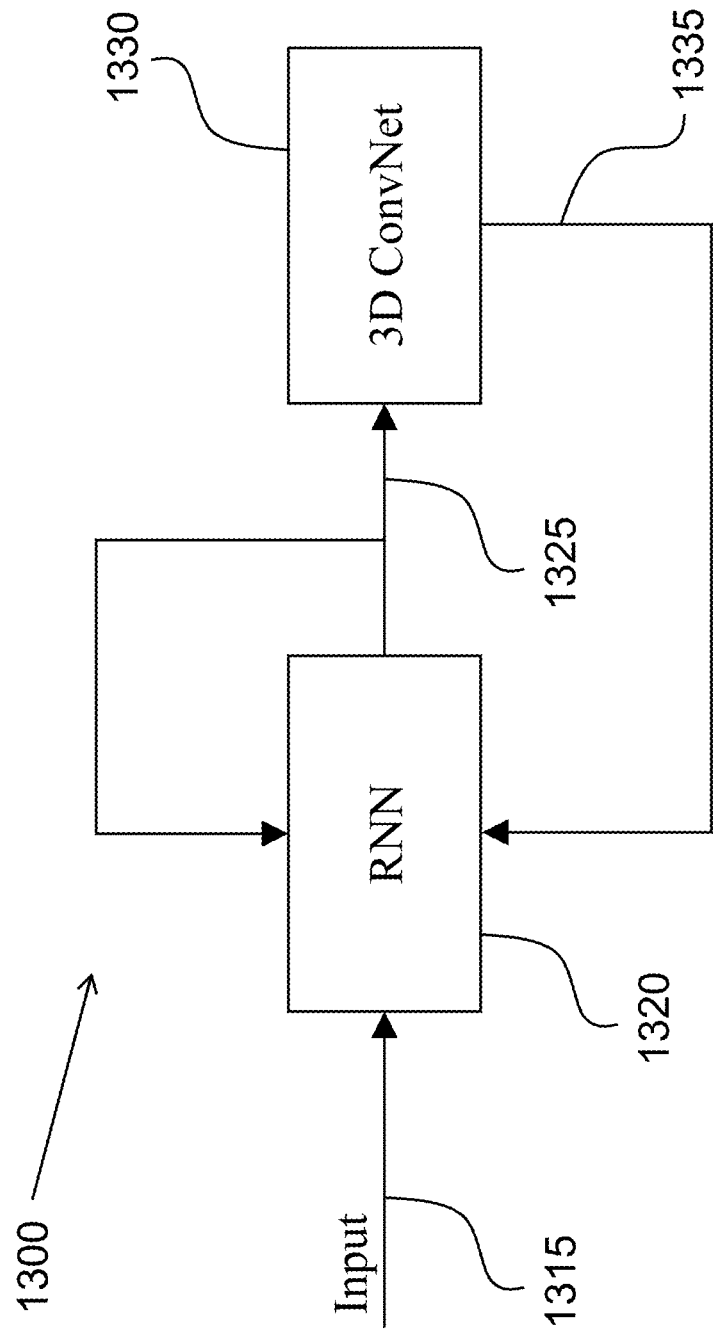
FIG. 13 is a block diagram illustrating the interaction between the neural network processing components of an example sign language translation system.

FIG. 13 shows the interaction between the neural network processing components of an example sign language translation system in accordance with some embodiments of the disclosed technology. In FIG. 13, the 3D ConvNet 1330 is able to track a sign language movement across time, and the RNN 1320 is able to persist the 3D ConvNet results across multiple frames to advantageously enable accurate identification of sign language movements. The RNN 1320 receives an input 1315 (e.g. one or more frames of a sign language movement) and processes it to generate an output 1325. This output 1325 is fed back to the RNN 1320, as well as sent to the ConvNet 1330. The ConvNet 1330 processes the RNN output 1325 and generates its own output 1335, which is transmitted back to the RNN 1320, and used with subsequent frames to recognize the sign language movement.

A hybrid combination of neural network processing, which utilizes a combination of RNN and a 2D CNN, represents less than 1% of neural networks that are currently being used across a myriad of applications, which is dominated by reinforcement learning networks (25%), standalone RNNs (25%-50%), and standalone CNNs (25%-50%). In contrast to the common neural network frameworks used in existing systems, some embodiments of the presently disclosed technology use an RNN to control a 3D-CNN to accurately detect sign language movements. That is, motion or action recognition is achieved using the described specific configuration of component neural networks to advantageously enable the identification of temporal information. Since the RNN is able to persist data across the multiple frames, it is able to identify the sign language movement, determine when the movement (or gesture) has been completed, and can reset for a new gesture given an input stream of multiple frames.

In an example of the runtime operation of the configuration illustrated in FIG. 13, multiple frames corresponding to a single sign language movement (that include both spatial and temporal information) are input to the RNN 1320. The RNN 1320 processes a first frame to generate an output 1325, and passes the first frame to the 3D ConvNet 1330, which can identify whether the frame includes a specific structure (e.g., hand configuration, pose, etc.) that is associated with the sign language movement. Based on its training, the 3D ConvNet 1330 can identify the specific structure, and further determine whether the structure belongs to a sign language movement. The output of the CNN is fed back to the RNN, which uses the 3D ConvNet output 1335, as well as its own output 1325 in a second iteration that now processes a second frame of the multiple frames.

The example configuration that is illustrated in FIG. 13, provides significant improvements over the existing systems that use 2D CNNs to conduct image recognition of a static image. In addition to the use of a 3D CNN, recognition of the hand gestures is improved through the use of a controller RNN. As noted earlier, sign language is a complex form of communication that includes the user's emotions and body language, as well as the user's hand gestures. Implementations of the presently disclosed technology are able to leverage this additional information related to emotions and body language to provide more accurate identification of the SL movements. Each additional source of information (e.g., an emotion detection module, a pose detection module, etc.) is termed a collaborator.

Figure 14A:
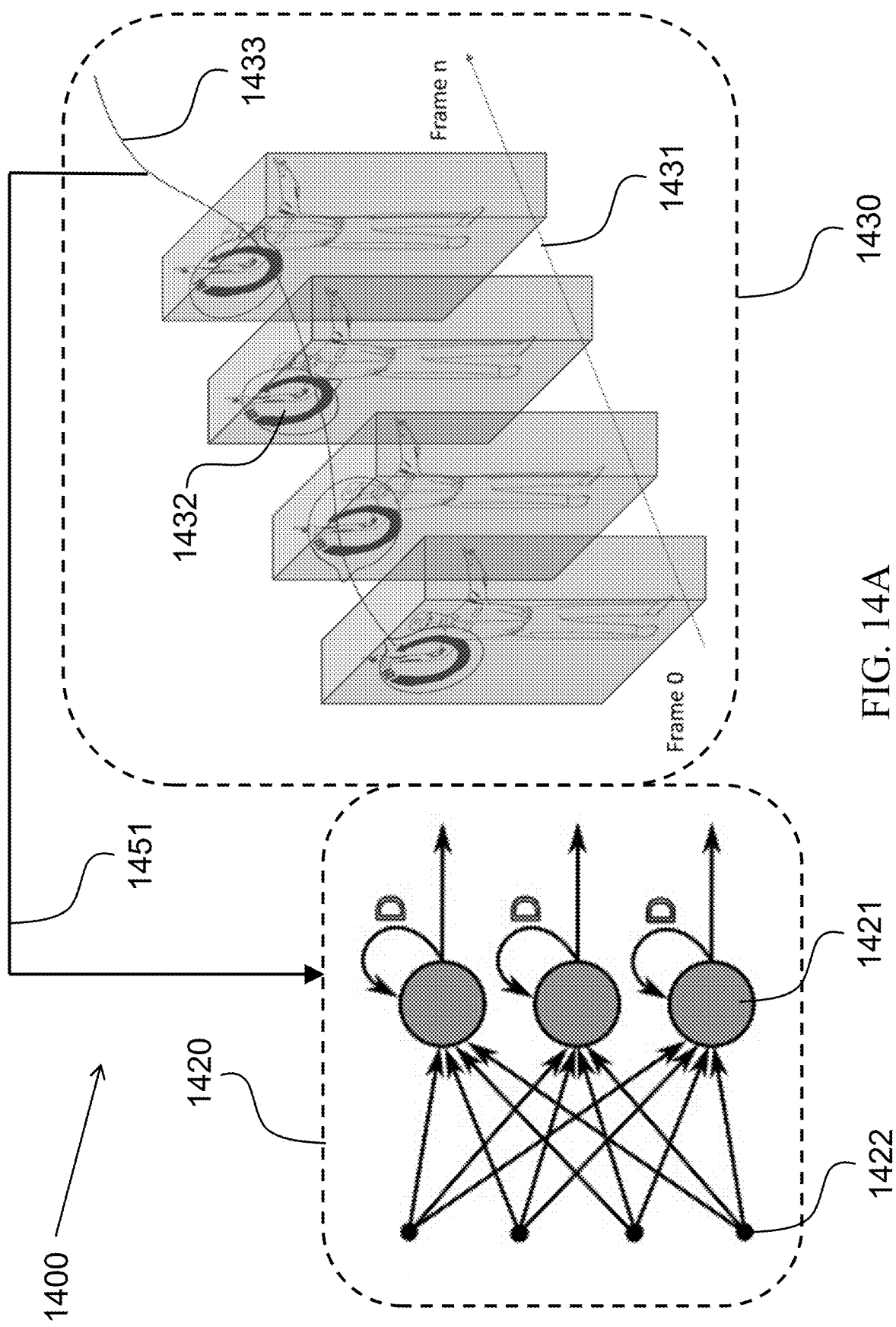
FIGS. 14A and 14B illustrate a recurrent neural network (RNN) arbitrating message routing and response processing to and from a 3D convolutional neural network (CNN).

FIG. 14A shows an example of a system 1400 with two components that may be used for sign language translation based on neural network processing. As illustrated in FIG. 14A, the sign language translation system 1400 includes a recurrent neural network (RNN) 1420 and a 3D convolutional neural network (CNN or ConvNet) 1430.

As illustrated in FIG. 14A, the CNN 1430 can process multiple sequential frames 1431 (denoted Frame 0 through Frame n), and can track an action or motion 1432 that is evolving over time 1433. In an example, each of the set of frames 1431 includes a set of (R,G,B) values for each (x,y) pixel location. Each frame additionally includes a timestamp that establishes a 3D set of information that can be used by the 3D CNN to detect the motion or action corresponding to a movement in the sign language.

In some embodiments, each of the set of frames 1431 may be a composite of multiple frames taken from different cameras and/or angles. For example, an infra-red (IR) camera can be used in conjunction with one or more regular (or depth-enabled) cameras, and frames from each of the cameras with the same timestamp can be combined prior to processing by the RNN/CNN framework. In other embodiments, each of the set of frames 1431 can include multiple subframes with the same timestamp. In this example, the 3D CNN may be augmented to incorporate the addition complexity of another dimension.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory.

For example, sequential information is preserved in the recurrent network's hidden state, which manages to span many time steps as it cascades forward to affect the processing of each new example; it finds correlations between events separated by many moments. These correlations are called "long-term dependencies" because an event downstream in time depends upon, and is a function of, one or more events that came before. As illustrated in FIG. 14A, the RNN 1420 has a plurality of output nodes (e.g., 1421); each output node produces an output "D" which is sent to the 3D-CNN, and is also sent back into the RNN (e.g., its feedback loop). The RNN additionally includes hidden nodes (e.g., 1422) that are able to process both new and feedback information in order to persist features that the RNN has been trained to recognize and/or identify.

Each of these neural networks can operate in two modes: training mode and interpretation (or execution) mode. In training mode, the neural network receives known inputs and associated meanings and other information. In interpretation mode, the neural network attempts to identify and interpret the inputs data that is collected by the disclosed interactive sign language system. The modes of operation can be selectively enabled or disabled to allow the system to be configured for one or the other mode of operation.

The output 1451 of the 3D CNN 1430 returns to the arbitrating RNN 1420 for temporal persistence. In other words, the 3rd dimension of the 3D CNN is configured to track the temporal dimension for grouping the sequence of frames of a sign language gesture. The 3D CNN typically receives an image and identifies which gesture it belongs to, but does so on a frame-by-frame basis. Thus, the output of the CNN, as well as the RNN's feedback loop, is used to persist the recognition of the sign language gesture.

In the example configuration that is shown in FIG. 14A, the RNN is responsible for the incremental progress of recognition of sequences within these groups of sequences being held in the 3D CNN. To this end, the 3D CNN uses its 3rd dimension to track sets of frames for activities that happen across time that need to be recognized, and the RNN uses its feedback loop to persist the incremental progress of the recognition of frames where the frames are tied to specific activities. The operations are further described using an example scenario that follows.

Figure 14B:
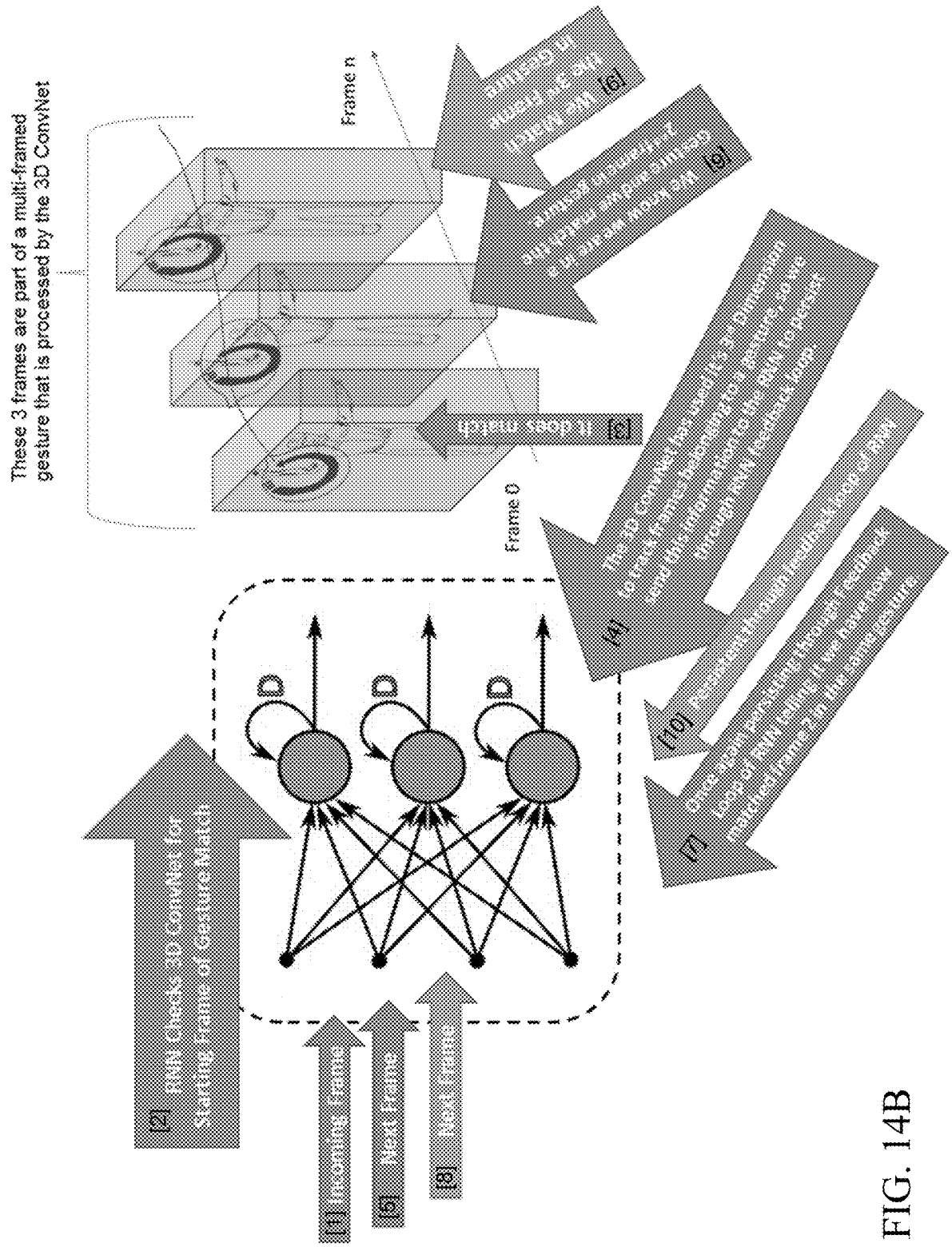

FIG. 14B shows an example method for processing three frames corresponding to a sign language gesture using the integrated RNN and 3D CNN neural network architecture of FIG. 14A. This example includes some features and/or components that are similar to those illustrated in FIGS. 13 and 14A, and described above. At least some of these features and/or components may not be separately described in this section. The process in FIG. 14B is described as a sequence of operations (numbered 1 through 9) by the way of example, and not by limitation, to facilitate the understanding of the disclosed technology.

As illustrated in FIG. 14B, three frames (denoted with large arrows [1], [5] and [8], and representing an initial frame, an intermediate frame and a final frame, respectively) are processed by the integrated RNN and 3D CNN architecture, where the 3D CNN recognizes activities based on the input frames, and the RNN persists the incremental progress of the recognition of frames. At operation [1], a first frame is received by the RNN, which passes the frame to the 3D CNN. At operation [2], the RNN checks whether the 3D CNN has recognized the initial frame as being a starting frame of a sign language gesture that the system has been trained to recognize. In some instances, and as will be described below in the context of FIGS. 16 and 17, the RNN may check for and combine results from other detection algorithms with those from the 3D CNN.

In operation [3], the 3D CNN matches the initial frame to the starting frame of a sign language gesture. As indicated in FIG. 14B, the three frames illustrated are part of a multi-framed gesture that can be processed and identified by the 3D ConvNet. In operation [4], since the 3D CNN has used its 3rd dimension to track the gesture that the initial frame belongs to, the output of the 3D CNN (including which candidate gesture, or gestures, that may have the initial frame as their starting frame) is passed back to the RNN to persist through the RNN feedback loop.

In operation [5], the RNN receives an intermediate frame, and passes it to the 3D CNN. In operation [6], the 3D CNN recognizes the intermediate frame as the second frame of the gesture that was identified in operation [3]. The indication of the recognition is fed back to the RNN in operation [7], so that the RNN may persist the knowledge of having recognized the 2nd frame in the same gesture.

Although the example illustrated in FIG. 14B includes three frames (an initial frame, an intermediate and a final frame), the method and processing described in the context of FIG. 3B may be extended to any number of intermediate frames. In an example, any number of intermediate frames may be received by the RNN, sent to the 3D CNN for recognition as a subsequent frame of the gesture identified in operation [3], where the 3DCNN's output is then sent back to the RNN for persistence.

In operation [8], a third frame is received by the RNN and forwarded to the 3D CNN, which recognizes it as a third frame in the gesture in operation [9]. As described above for subsequent frames of the sign language gesture, the RNN persists the output of the 3D CNN in operation [10]. This may continue till the final frame of the sign language gesture is received and recognized by the 3D CNN. The RNN may confirm the identification of the sign language gesture based on the 3D CNN since it has persisted the outputs through the process.

Figure 15:
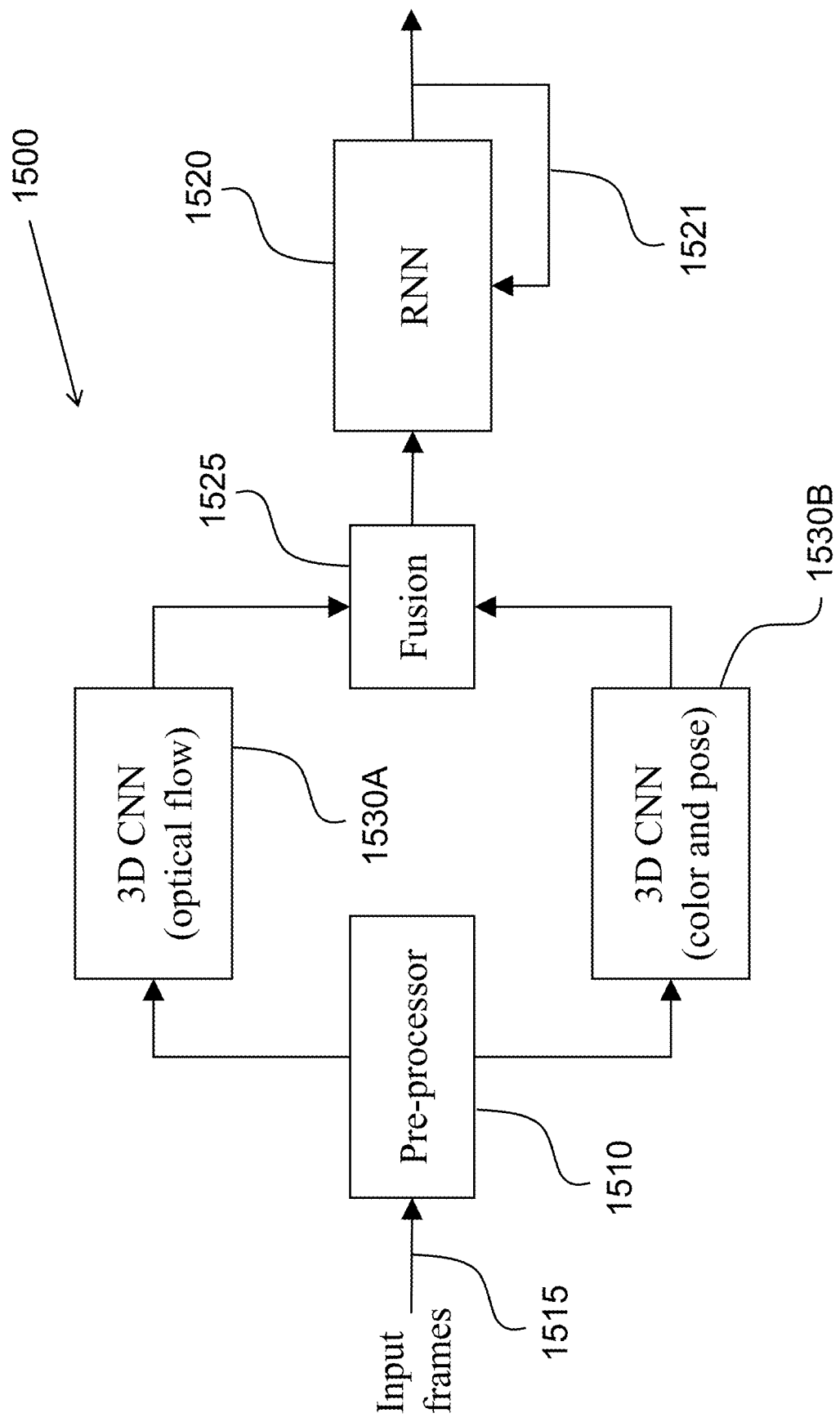
FIG. 15 is an example block diagram illustrating the interaction between the neural network processing components of another exemplary sign language translation system.

FIG. 15 shows the interaction between the neural network processing components of another example sign language translation system in accordance with some exemplary embodiments. The input frames 1515 in FIG. 15 may be captured from a web-cam or another sensor (e.g., a depth-field camera or RGB camera with multiple apertures, an audio sensor, etc.) In some embodiments, more recent input frames may be captured concurrently with the processing of previously captured input frames. The input frames are first processed by a pre-processor 1510, which may be configured to implement pose estimation algorithms (e.g., using OpenPose in OpenCV or MultiPoseNet) that estimate a pose in each of the input frames, therein identifying the body, face and fingers of the subject.

Pose estimation is a general problem in computer vision wherein the position and orientation of an object are detected. Typically, this results in keypoint locations that describe the objects (referred to as the "pose") being detected, thereby resulting in a "skeleton" that was previously shown in FIG. 12C (wherein the information in a frame is reduced by generating an overlayed pose estimate). In some embodiments, the keypoint locations (and the skeleton) are detected in each of the input frames 1515. In some embodiments, differently colored pixels may be used when estimating the pose for each of the fingers to capture the nuances of sign language gestures. For example, one sign language gesture may be distinguished from another sign language gesture based on whether the index finger is above or below the middle finger, and using differently colored pixels for each finger enables exactly this type of differentiation. In some embodiments, the pose estimation may capture 3D data instead of just 2D data, thereby providing a greater number of features for the recognition process.

The pose estimation algorithms generate pixels corresponding to the pose of the subject, and the pre-processor overlays the pose estimation pixels onto the color (e.g., RGB or CMYK) pixels using a transparent layer. The original images with the pose estimation overlays are output as processed images by the pre-processor 1510.

As illustrated in FIG. 15, the images with the pose estimation overlays are concurrently processed by a first 3D CNN 1530A, which extracts the motion information in each frame (and across the frames) using precise optical flow algorithms, and a second 3D CNN 1530B, which extracts color, pose and spatial information from the processed frames.

Optical flow refers to a class of algorithms that uses sequences of ordered images to enable the estimation of motion as either instantaneous image velocities or discrete image displacements. In general, optical flow methods try to calculate the motion between two image frames which are taken at times t and t+Δt at every voxel (a "volume pixel" or a pixel in a three-dimensional space) position. These methods are called differential since they are based on local Taylor series approximations of the image signal; that is, they use partial derivatives with respect to the spatial and temporal coordinates.

Precise optical flow algorithms are refinements of standard optical flow methods, and include modifications of the image pixels using sharpening, line, edge, corner and shape enhancements. This results in a finely detailed version of optical flow, where motions of smaller objects (e.g., fingers and hands) are recognized and can be used for recognition of the sign language gesture communicated by the subject.

The fusion module 1525 combines the output layers of each of the 3D CNNs (1530A and 1530B), allowing their data (e.g., convolution, propagation and weights) to be processed jointly. This results in the recognition process implemented by the 3D CNNs to be fused across both the optical flow (for motion) and color and pose domains, and more accurate recognition of the sign language gestures communicated by the subject.

The recognition results from the fusion module 1525 are sent to the RNN 1520, which uses long short-term memory (LSTM) units to track the progress of recognition across previous, current and future input frames, i.e., temporally. The RNN with LSTM units uses its own feedback loop 1521 to track state across more than a single round of recognition.

It should be noted that the architecture illustrated in FIG. 13 represents a stateless neural network that requires all the input frames to be passed in at the same time to be processed in a batch format. In contrast, the architecture illustrated in FIG. 15 represents a stateful neural network that can operate with the input frames that are passed in sequentially, and processed in an incremental or online manner.

Although implementations of the presently disclosed technology have been described in the context of accurately recognizing a sign language movement, the RNN/CNN and CNN/RNN configurations illustrated in FIGS. 13 and 15, respectively, are applicable to recognition of actions or movements of an object or a user in other contexts and applications, such as object recognition for unmanned aerial vehicles (UAVs), autonomous vehicles, surveillance and security systems, target identification, and training and analysis in professional sports. In other words, the 3D CNN (fully or partially trained using the proper training images) is able to recognize any temporal action that can be captured using a series of frames, each with pixel information and a timestamp, and the RNN is able to control the 3D CNN to persist the information that relevant to the action or movement being recognized. More generally, the disclosed configurations of the 3D CNN(s) and the RNN may be used recognize any time-varying activity in three-dimensions.

Figure 16:
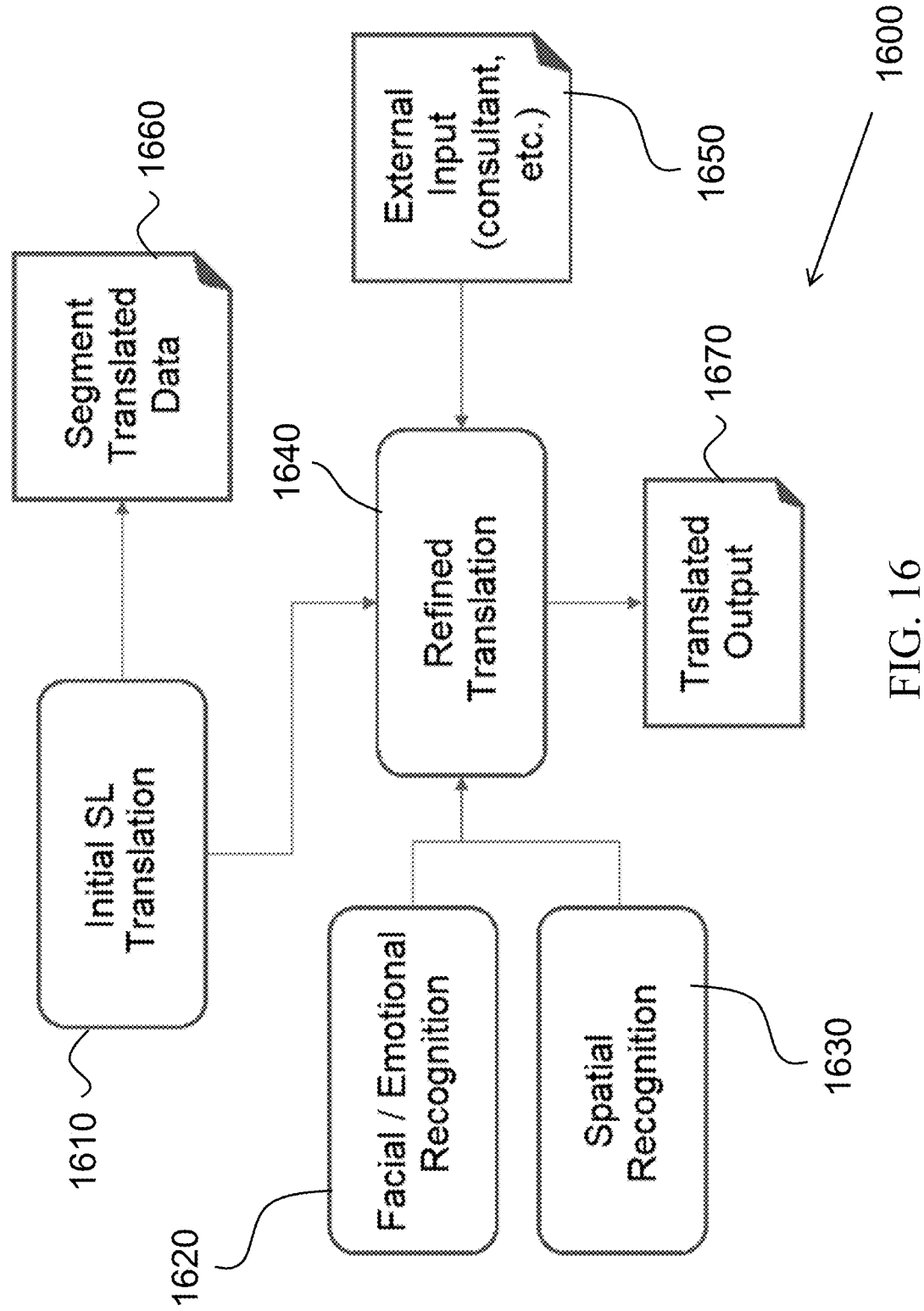
FIG. 16 is an example block diagram illustrating the integration of various collaborators in a sign language translation system.

FIG. 16 is a block diagram of an example of the integration of various collaborators in a sign language translation system. In this example, the RNN and 3D CNN may be used to generate an initial sign language translation 1610, which can be output as segment translated data 1660 and/or refined using collaborators. As illustrated in FIG. 16, the refined translation 1640 may be based on the initial sign language translation 1610, facial/emotional recognition 1620, spatial (or pose) recognition 1630 and external input 1650, and results in a translated output 1670, which is more accurate than one based on the initial sign language translation.

Facial/emotional recognition 1620, spatial (or pose) recognition 1630 and external input 1650 are examples of collaborators that can be integrated, when they exist, with the initial sign language translation 1610 to provide a refined translation 1640. In an example, the external input 1650 may include a portion of a text, an object, a person or other items that the subject is pointing to or is otherwise referencing, as well as objects, lighting conditions, background settings, sounds or other passive items or conditions that can be captured by the sensing devices.

Figure 17:
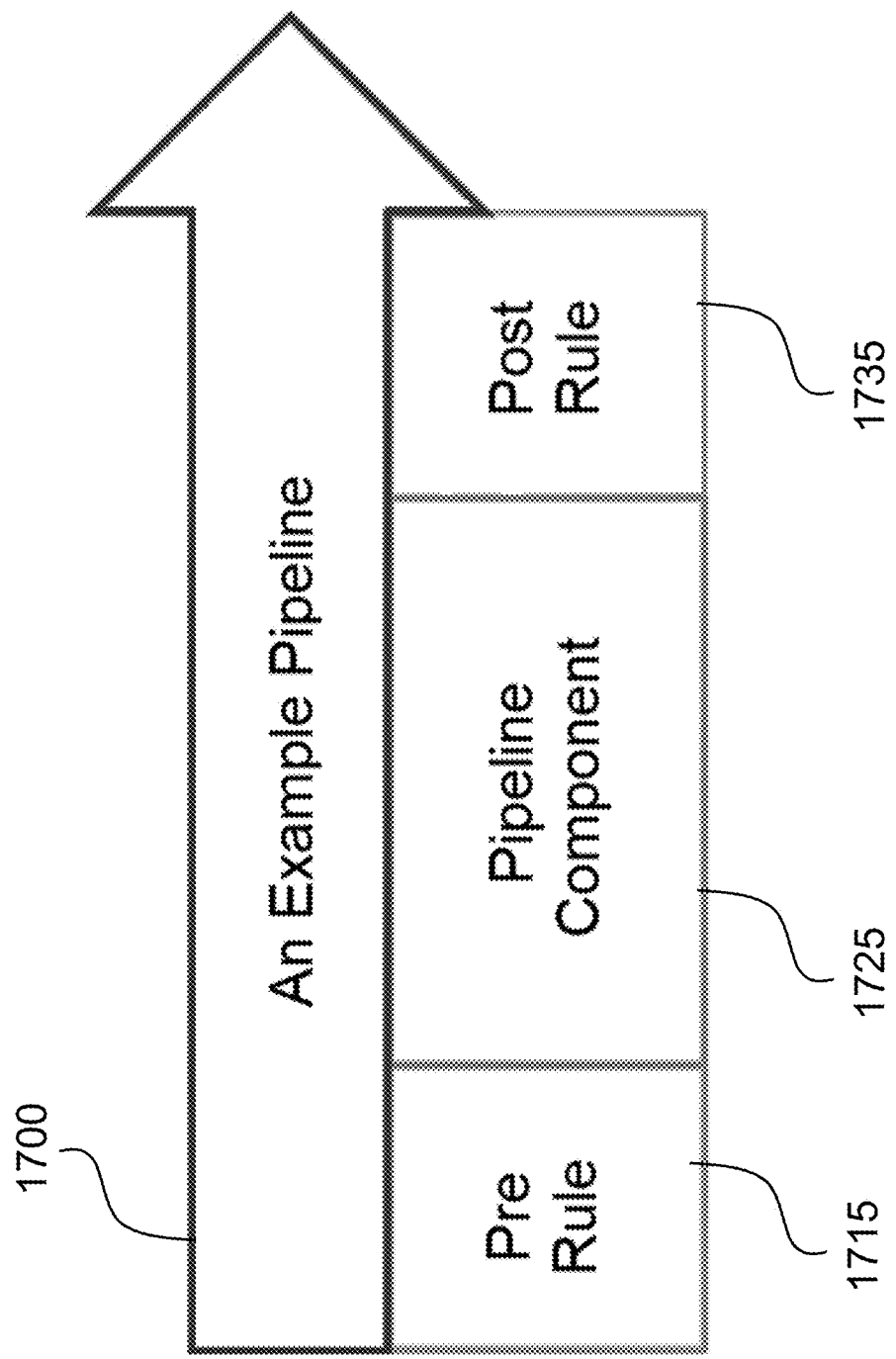
FIG. 17 is an example block diagram illustrating a pipeline that can be utilized to implement various portions of the presently disclosed technology.

The use of collaborators described in the context of FIG. 16, as well as any additional or future implementations of collaborators, necessitates the integration of the collaborator into the RNN/CNN workflow. This task, from a practical sense, can require significant changes to computer code when a collaborator is added or removed from the processing flow, making such changes expensive, time consuming, and in some cases (e.g., when the source code is not accessible) not possible. To address these issues, the disclosed embodiments further provide a pipeline structure that facilitates the integration of collaborators into the neural network processing engine. FIG. 17 illustrates an example of such a pipeline 1700, which is a configurable workflow management tool for artificial intelligence that supports the ability to easily use different combinations of artificial intelligence components at runtime with different input and output based on conditional criteria. In other words, and in the context of FIG. 16, the pipeline 1700 provides a framework to integrate a collaborator when it has additional information that can improve the accuracy of the sign language translation.

As illustrated in FIG. 17, the pipeline 1700 includes a pre-rule 1715, a pipeline component 1725 and a post-rule 1575. In the example illustrated in FIG. 17, the pre-rule 1715 and post-rule 1735 are conditional rules that can be executed before and after running the pipeline component 1725, respectively, and are constructed using AND, OR, NOT and {=, !=, >, <} (equal to, not equal to, greater than, smaller than) functionals. The pipeline component 1725 is the functional object which includes blocks of logic that transform an input to an output, e.g., a standalone RNN or CNN, an RNN controlling a 3D CNN, etc.

For example, the pre-rule 1715 may be configured to check whether or not an input contains pixels and the pipeline component 1725 may be a 2D CNN. If the pre-rule detects that an input frame contains pixels, then the 2D CNN implements object recognition. On the other hand, if the pre-rule detects that the input frame does not contain pixels, then the 2D CNN may be configured to implement audio recognition.

In an exemplary implementation, a new neural network (or more generally, an artificial intelligence component) can be registered using a configuration file, which may include a name and description of the component, how it is invoked and what its inputs and output are (e.g., akin to specifying an API for the new component). Upon registration, the new neural network pipeline component may be integrated into an existing simulation as a collaborator.

Figure 18:
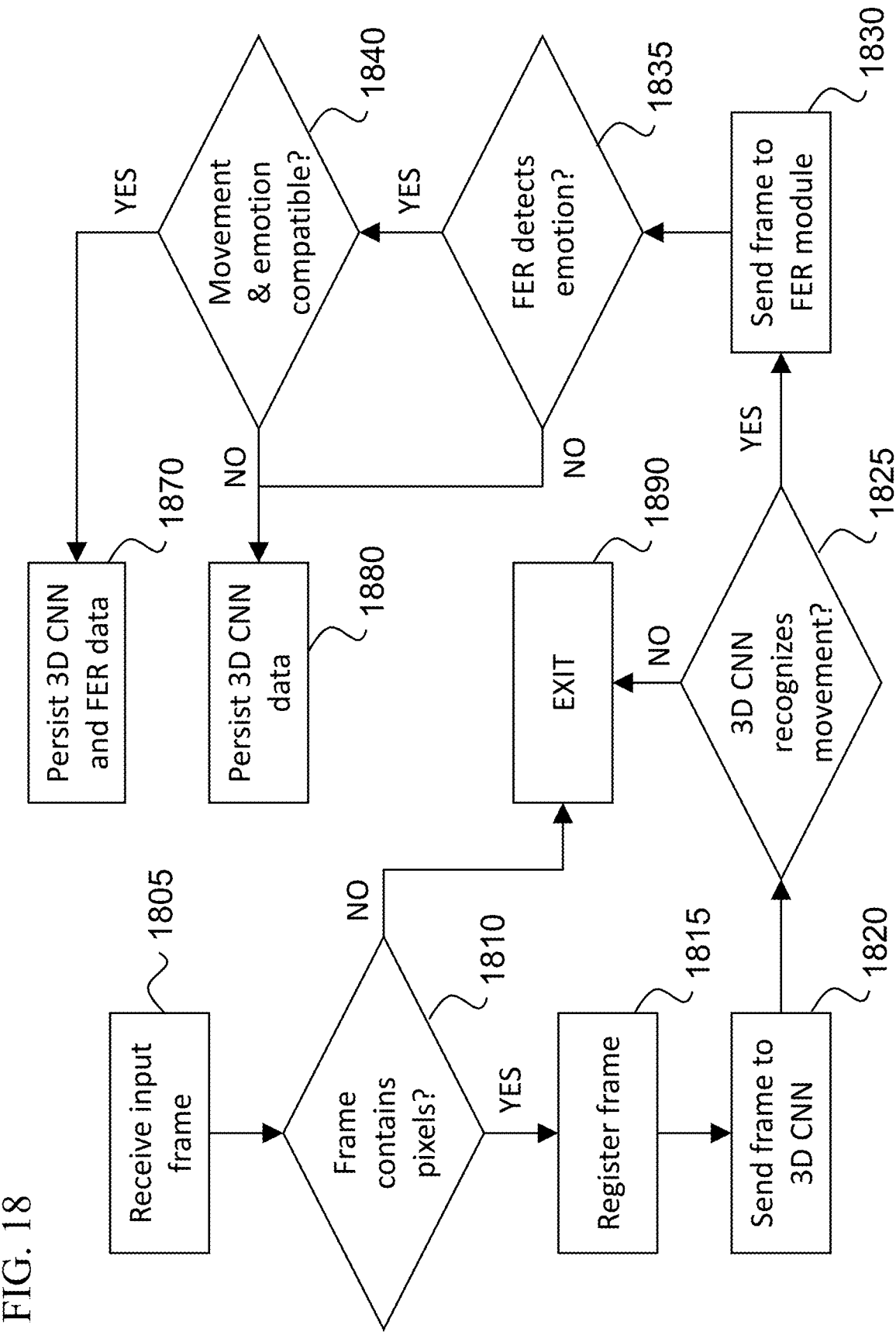
FIG. 18 is a flowchart illustrating an example method for the operation of a sign language translation system with a collaborator.

For example, a sign language translation system may include three pipeline components: (i) an RNN, (ii) a 3D ConvNet, (ii) a facial and/or emotional recognition (FER) module. The RNN may have four pre-rules and a post-rule, whereas the 3D ConvNet and the FER module each have one pre-rule and one post-rule. FIG. 18 shows a flowchart that outlines the operation of this exemplary sign language translation system in accordance with some embodiments of the disclosed technology. To facilitate the understanding the operations in FIG. 18, certain example pre- and post-rules are used to describe the below operations. It is, however, understood that other types of pre- and post-rules can be used in other implementations within the scope of the present disclosure.

The operations start by receiving a frame at the RNN 1805, whose first pre-rule checks whether the frame includes pixels 1810. Upon confirming that the frame contains pixels (YES at 1810), the RNN registers the frame 1815 as the first frame in a sign language movement it is trying to recognize.

In some embodiments, and as illustrated in the example in FIG. 18, if the frame does not contain pixels (NO at 1810), then the current process terminates 1890, which can cause the processing engine to await additional data (e.g., return to 1805), may continue the recognition process based on its own internal logic and processing, or may exit all together. In some embodiments, the RNN may activate a 2D ConvNet to perform audio recognition upon a determination that the current frame does not include image pixels.

Upon determining that the frame contain pixels (YES at 1810), the RNN sends the frame to the 3D ConvNet 1820. The operations that are carried out by the 3D ConvNet (not illustrated in FIG. 18), can include using the pre-rule to check whether the frame includes pixels. Upon confirming that the frame contains pixels, the 3D ConvNet processes the frame and checks whether the frame matches the first frame of any action or motion it has been trained to recognize. The output of the recognition process is sent to the post-rule of the 3D ConvNet, which checks whether the identification was successful.

If the 3D ConvNet the identification is not successful, the RNN receives a negative indication from the 3D ConvNet and determines that the movement cannot be recognized (NO at 1825), thus terminating the current process 1890. If the 3D ConvNet the identification is successful, the 3D ConvNet sends an indication to the RNN, where the indication includes one or more sign language movements that the frame may have matched. The RNN receives this information and prior to accepting it, executes its second pre-rule to determine whether the 3D ConvNet was successful in its detection 1825, and if it was, sends the frame to the FER module collaborator 1830.

The operations at the FER module (not illustrated in FIG. 18) can include using the pre-rule to check whether the frame is part of a sign language movement it can recognize. Upon confirming that the frame corresponds to at least one candidate sign language movement, the FER module performs facial and/or emotion detection (e.g., using 32 reference points on a subject's face) and pass the result to the RNN. In some embodiments, the FER module relies on training images that include the relevant emotions that are commonly used as part of sign languages. Additionally, pose estimation results are available on a subset of the training images, and during the execution phase of the neural network, these training images (and the relevant emotions and poses) may be used to recognize emotions in the captured video/images in real-time.

The RNN executes its third pre-rule which checks whether the FER module collaborator has detected an emotion 1835. Upon determining that an emotion has been detected (YES at 1835) and, the RNN executes its fourth pre-rule that checks whether the emotion is compatible with the sign language movement 1840. If the RNN determines that the 3D CNN recognized movement and the FER module recognized emotion are compatible (YES at 1840), the process moves to operations identified as 1870, wherein the RNN persists both the 3D CNN and FER module data. In other words, if the movement and the emotion are part of a SL movement that the RNN is able to identify (based on its training stage), they are stored by the RNN. In this mode of operation, the RNN operates like a database in that any data that is relevant to the identification of the SL movement is stored (or persisted) by the RNN.

As illustrated in FIG. 18, if the emotion detected by the FER module is not compatible with the sign language movement detected by the 3D ConvNet (NO at 1840), or if the FER module does not detect an emotion (NO at 1835), the RNN persists the frame 1880, but not the emotion. This is followed by the RNN continuing to identify the sign language movement based on subsequent frames, or exiting the current process if there are no subsequent frames or information.

In another example, a second collaborator that performs pose estimation may be incorporated at runtime. The pose estimation collaborator may be advantageously used to improve recognition accuracy even when the subject is partially obscured. As described above, the RNN may be configured to interact with multiple pipeline components and persist the relevant data from each of them in order to accurately identify a sign language movement.

In yet another example, different sensors (e.g., audio sensors, haptic sensors, non-visible light sensors, etc.) that may be used to capture the sign language movement may be integrated into the neural network processing framework using the pipeline framework, as described above. For example, subjects who primarily use sign language to communicate may try to accommodate for hearing people with poor signing skills by vocalizing the words sometimes, or to convey additional aspects of the information being signed. Implementations of the disclosed technology can capture this audio (and sometimes haptic) input, which can be integrated into the neural network processing to improve the recognition of the movements of the signed language.

In some embodiments, the disclosed technology provides a neural network system adapted for processing images associated with a gesture. This system includes one or more three-dimensional convolution neural networks (3D CNNs), each of the 3D CNNs comprising an input to receive a plurality of input images, and an output to provide recognition information produced by each of the 3D CNNs, at least one recurrent neural network (RNN) comprising an input to receive a second type of recognition information, and an output that is coupled to the input of the at least one RNN to provide a feedback connection, and one or more processors coupled to a non-transitory memory with instructions stored thereon, the instructions upon execution by the processor, causing the processor to receive a plurality of captured images at a pre-processing module, perform pose estimation on each of the plurality of captured images, and overlay pose estimation pixels onto the plurality of captured images to generate the plurality of input images for consumption by the one or more 3D CNNs, and receive the recognition information produced by each of the one or more 3D CNNs at a fusion module, and aggregate the received recognition information to generate the second type of recognition information for consumption by the at least one RNN, wherein each of the one or more 3D CNNs is operable to produce the recognition information comprising at least one characteristic associated with the gesture in each of the plurality of images, and provide the recognition information to the fusion module, the at least one characteristic comprising a pose, a color or a gesture type, and wherein the at least one RNN is operable to determine whether the recognition information produced by the one or more 3D CNNs corresponds to a singular gesture across the plurality of input images.

Figure 19:
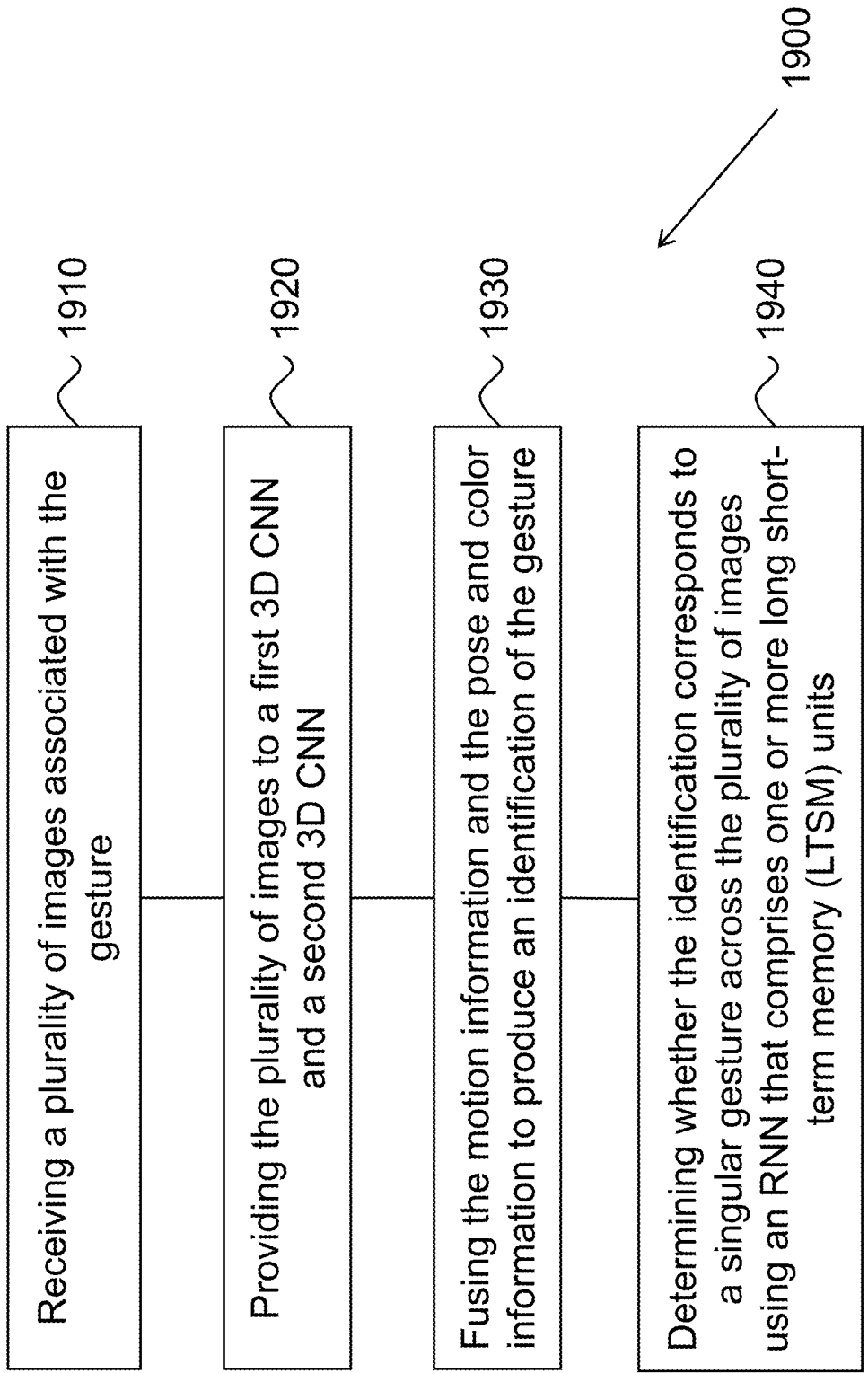
FIG. 19 is a flowchart illustrating an example method for sign language recognition using neural networks, in accordance with the presently disclosed technology.

FIG. 19 is a flowchart illustrating an example method 1900 for gesture recognition using neural networks. The method 1900 includes, at operation 1910, receiving a plurality of images associated with the gesture.

The method 1900 includes, at operation 1920, providing the plurality of images to a first 3D CNN and a second 3D CNN, wherein the first 3D CNN is operable to produce motion information, wherein the second 3D CNN is operable to produce pose and color information, wherein the first 3D CNN is operable to implement an optical flow algorithm to detect the gesture.

The method 1900 includes, at operation 1930, fusing the motion information and the pose and color information to produce an identification of the gesture.

The method 1900 includes, at operation 1940, determining whether the identification corresponds to a singular gesture across the plurality of images using an RNN that comprises one or more long short-term memory (LTSM) units.

In some embodiments, the method 1900 may further comprise the operation of pre-processing a plurality of captured images to generate the plurality of images. In an example, the pre-processing the plurality of captured images includes applying a pose estimation algorithm to pixels of each of the plurality of images to produce overlay pixels corresponding to body, fingers and face of the subject, extracting color and spatial information from each of the plurality of images, and combining the overlay pixels and the color and spatial information to produce the plurality of images. In other embodiments, the method 1900 may further comprise the operations of identifying, based on the overlay pixels corresponding to the face of the subject, lip movements of the subject, and producing, based on the lip movements of the subject, textual information. In an example, the overlay pixels comprise pixels with different colors for each finger of the subject.

Embodiments of the disclosed technology include a neural network processing system adapted for processing images associated with a sign language gesture, wherein the system includes (a) a RNN comprising an input that receives the images associated with the sign language gesture, and an output that feeds back into the input, and (b) a 3D CNN comprising an input, coupled to the output of the RNN, that receives the images associated with the sign language gesture from the RNN, and an output, coupled to the input of the RNN, wherein the 3D CNN identifies each of the images associated with the sign language gesture and transmits a result thereof to the RNN, and wherein the RNN controls the 3D CNN and tracks the sign language gesture being identified by the 3D CNN.

Figure 20:
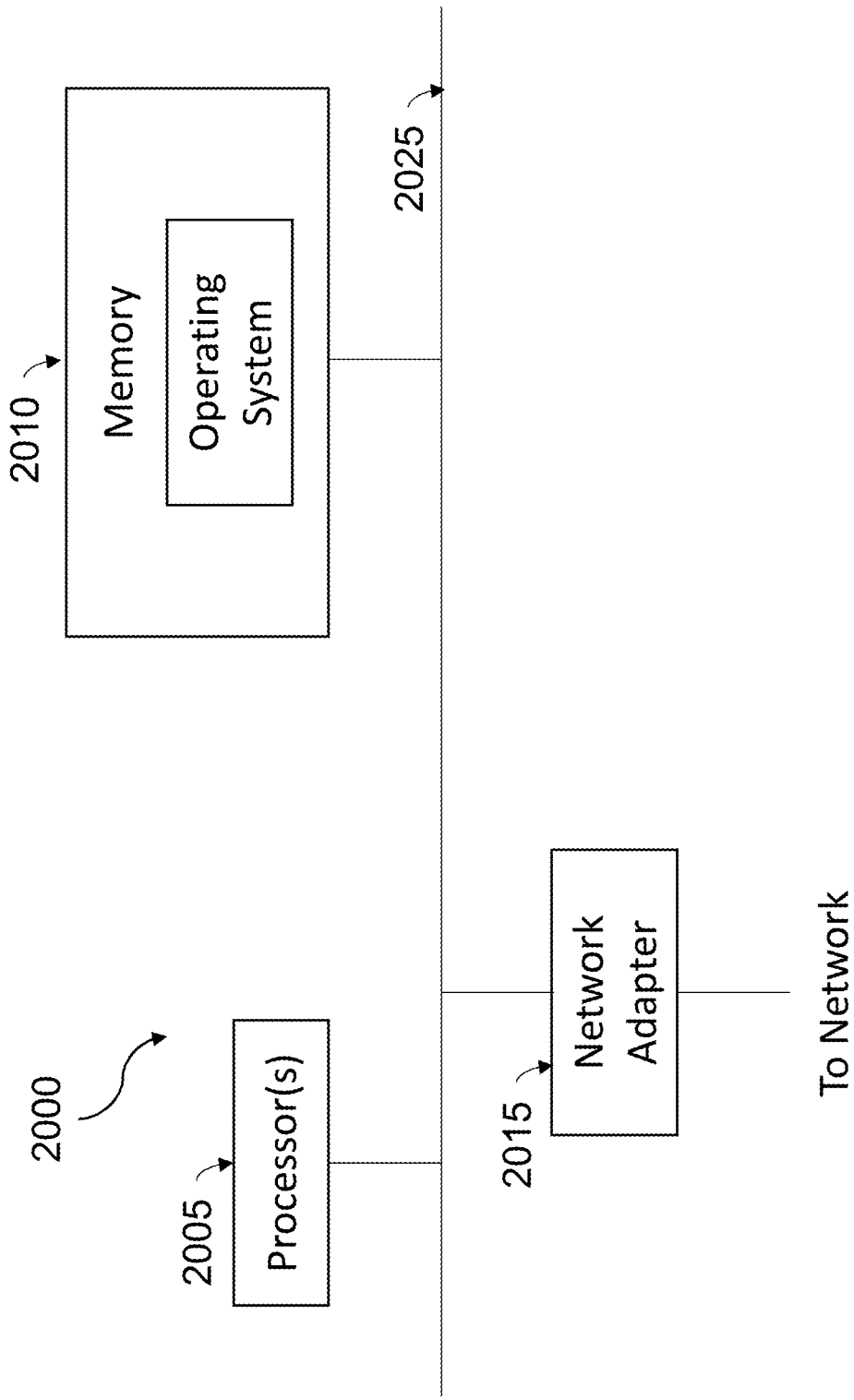
FIG. 20 is a block diagram illustrating an example of the architecture for a computer system or other control device that can be utilized to implement various portions of the presently disclosed technology.

FIG. 20 is a block diagram illustrating an example of the architecture for a computer system or other control device 2000 that can be utilized to implement various methods and portions of the presently disclosed technology. In FIG. 20, the computer system 2000 includes one or more processors 2005 and memory 2010 connected via an interconnect 2025. The interconnect 2025 may represent any one or more separate physical buses, point to point connections, or both, connected by appropriate bridges, adapters, or controllers. The interconnect 2025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2005 may include central processing units (CPUs) to control the overall operation of, for example, the host computer. In certain embodiments, the processor(s) 2005 accomplish this by executing software or firmware stored in memory 2010. The processor(s) 2005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2010 can be or include the main memory of the computer system. The memory 2010 represents any suitable form of random access memory (RAM), read-only memory (ROM), flash memory, or the like, or a combination of such devices. In use, the memory 2010 may contain, among other things, a set of machine instructions which, when executed by processor 2005, causes the processor 2005 to perform operations to implement embodiments of the presently disclosed technology.

Also connected to the processor(s) 2005 through the interconnect 2025 is a (optional) network adapter 2015. The network adapter 2015 provides the computer system 2000 with the ability to communicate with remote devices, such as the storage clients, and/or other storage servers, and may be, for example, an Ethernet adapter or Fiber Channel adapter.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device for processing images associated with a gesture, comprising:
   at least one camera; and
   at least one processor configured to implement:
      one or more three-dimensional convolution neural networks (3D CNNs), each of the 3D CNNs comprising:
         an input to receive a plurality of input images from the at least one camera, and
         an output to provide recognition information produced by each of the 3D CNNs, and
      at least one recurrent neural network (RNN) comprising:
         an input to receive a second type of recognition information, and
         an output that is coupled to the input of the at least one RNN to provide a feedback connection, wherein the at least one processor is configured to:
receive a plurality of captured images at a pre-processing module, perform pose estimation on each of the plurality of captured images, and overlay pose estimation pixels onto the plurality of captured images to generate the plurality of input images for consumption by the one or more 3D CNNs, and
receive the recognition information produced by each of the one or more 3D CNNs at a fusion module, and aggregate the received recognition information to generate the second type of recognition information for consumption by the at least one RNN,
wherein each of the one or more 3D CNNs is operable to produce the recognition information comprising at least one characteristic associated with the gesture in each of the plurality of input images, and provide the recognition information to the fusion module, the at least one characteristic comprising a pose, a color or a gesture type, and
wherein the at least one RNN is operable to determine whether the recognition information produced by the one or more 3D CNNs corresponds to a singular gesture across the plurality of input images.

2. The device of claim 1, wherein a first of the one or more 3D CNNs is operable to use an optical flow algorithm to detect the gesture.

3. The device of claim 2, wherein the optical flow algorithm comprises sharpening, line, edge, corner and shape enhancements.

4. The device of claim 1, wherein the pose estimation identifies a body, fingers and face of a subject performing the gesture.

5. The device of claim 1, wherein the one or more 3D CNNs and the at least one RNN are implemented on the at least one processor.

6. The device of claim 1, wherein the at least one processor is configured to:
process the plurality of captured images to extract pixels corresponding to a subject, a foreground and a background in each of the plurality of captured images;
perform spatial filtering, upon determining that the background or the foreground includes no information that pertains to the gesture being identified, to remove the pixels corresponding to the background or the foreground.

7. The device of claim 1, wherein a first 3D CNN of the one or more 3D CNNs is operable to use an optical flow algorithm to detect the gesture, and wherein the at least one characteristic identified by the first 3D CNN comprises the gesture type.

8. The device of claim 7, wherein a second 3D CNN of the one or more 3D CNNs is operable to process the pose estimation pixels to associate a pose with the gesture, and wherein the at least one characteristic identified by the second 3D CNN comprises the pose.

9. The device of claim 8, wherein a third 3D CNN of the one or more 3D CNNs is operable to process an expert analysis of the gesture, and wherein the at least one characteristic identified by the third 3D CNN comprises the gesture type.

10. The device of claim 1, wherein the at least one RNN comprises one or more long short-term memory (LTSM) units.

11. The device of claim 1, wherein the fusion module is operable to concurrently process at least one output node of each of the one or more 3D CNNs.

12. The device of claim 1, wherein the at least one camera comprises at least one of a stereo camera, a camera augmented with a depth sensor, a multi-aperture camera, or a right camera and a left camera.

13. The device of claim 1, comprising:
a left microphone and a right microphone configured to capture environmental and contextual cues that are different from the plurality of captured images.

14. The device of claim 1, comprising a front display.

15. The device of claim 14, comprising a rear display that is a touchscreen display.

16. The device of claim 1, wherein the at least one processor comprises at least one graphics processing unit (GPU).

* * * * *